United States Patent
Nishizaki

(10) Patent No.: US 10,735,332 B2
(45) Date of Patent: Aug. 4, 2020

(54) COMMUNICATION SYSTEM INCLUDING INFORMATION PROCESSING APPARATUS AND MEDIATION APPARATUS CAPABLE OF TRANSMITTING COMMAND TO DEVICE IN APPROPRIATE ORDER

(71) Applicant: BROTHER KOGYO KABUSHIKI KAISHA, Nagoya, Aichi (JP)

(72) Inventor: Takashi Nishizaki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/382,341

(22) Filed: Apr. 12, 2019

(65) Prior Publication Data
US 2019/0319888 A1    Oct. 17, 2019

(30) Foreign Application Priority Data
Apr. 13, 2018 (JP) ................................ 2018-077397

(51) Int. Cl.
*G06F 15/173* (2006.01)
*H04L 12/833* (2013.01)
(Continued)

(52) U.S. Cl.
CPC ........ *H04L 47/2458* (2013.01); *G06F 3/1203* (2013.01); *G06F 3/1231* (2013.01);
(Continued)

(58) Field of Classification Search
USPC ....... 709/203, 206, 207, 219, 223, 224, 226, 709/228, 230, 232, 238; 714/4.1; 726/11
See application file for complete search history.

(56) References Cited

U.S. PATENT DOCUMENTS

| 7,673,168 B2 * | 3/2010 | Matsuda | ............. G06F 11/0709 709/219 |
| 2005/0177637 A1 * | 8/2005 | Heron | ..................... H04L 41/00 709/227 |

(Continued)

FOREIGN PATENT DOCUMENTS

JP        2017-536598 A    12/2017

*Primary Examiner* — Quang N Nguyen
(74) *Attorney, Agent, or Firm* — Scully, Scott, Murphy & Presser, PC

(57) ABSTRACT

In a communication system, an information processing apparatus including a first controller and a memory and a mediation apparatus including a second controller can communicate with each other via a firewall. The mediation apparatus can communicate with a device via a local network. Based on an acquired plurality of instruction information, the first controller generates first commands. When a setup is performed by the mediation apparatus, the first controller transmits the generated first commands to the mediation apparatus, and receives a response thereto. Upon receiving the first commands, the second controller generates second commands based on the first commands, and transmits the generated second commands to the device. One of the first controller and the second controller sets a transmission order for the second commands by setting a priority for each second command A second command having higher priority is transmitted prior to another second command having lower priority.

12 Claims, 8 Drawing Sheets

(51) Int. Cl.
 *G06F 3/12* (2006.01)
 *H04L 12/24* (2006.01)
(52) U.S. Cl.
 CPC .......... *G06F 3/1269* (2013.01); *G06F 3/1296* (2013.01); *H04L 41/0803* (2013.01)

(56) References Cited

U.S. PATENT DOCUMENTS

| | | | |
|---|---|---|---|
| 2013/0139243 A1* | 5/2013 | Poola | H04L 63/0254 726/11 |
| 2013/0246597 A1* | 9/2013 | Iizawa | H04L 69/40 709/223 |
| 2016/0085533 A1 | 3/2016 | Jayanti et al. | |
| 2016/0087854 A1 | 3/2016 | Jayanti et al. | |
| 2016/0087955 A1 | 3/2016 | Mohamad et al. | |
| 2016/0087956 A1 | 3/2016 | Maheshwari et al. | |
| 2016/0088021 A1 | 3/2016 | Jayanti et al. | |
| 2016/0088026 A1 | 3/2016 | Mohamad et al. | |
| 2017/0234916 A1* | 8/2017 | Lawlis | G01R 31/007 701/34.4 |
| 2017/0244743 A1* | 8/2017 | Key | H04L 63/1425 |

\* cited by examiner

FIG. 2

CORRELATION DATABASE DB

| DEVICE ID | GUID | LOCATION INFO | FIRMWARE VERSION | SETTINGS INFORMATION ||||| MODIFIED DATE | CONDITION INFO |
|---|---|---|---|---|---|---|---|---|---|
| | | | | FONT | FONT SIZE | DENSITY | ... | | |
| 001 | 00A | BRANCH OFFICE A | 2 | GOTHIC | 14 | 3 | ... | 2018.04.01 | MANAGING |
| 002 | 00A | BRANCH OFFICE A | 3 | GOTHIC | 14 | 3 | ... | 2018.04.03 | MANAGING |
| 003 | 00A | BRANCH OFFICE A | 2 | GOTHIC | 14 | 3 | ... | 2018.04.02 | MANAGING |
| 004 | 00B | BRANCH OFFICE B | 2 | GOTHIC | 12 | 2 | ... | 2018.04.02 | MANAGING |
| 005 | 00B | BRANCH OFFICE B | 2 | GOTHIC | 12 | 2 | ... | 2018.04.3 | MANAGING |
| 006 | 00C | BRANCH OFFICE C | 2 | MINCHO | 12 | 2 | ... | 2018.04.2 | MANAGING |
| 007 | 00C | BRANCH OFFICE C | 1 | MINCHO | 14 | 3 | ... | 2018.04.02 | MANAGING |
| 008 | 00C | BRANCH OFFICE C | 2 | MINCHO | 12 | 2 | ... | 2018.04.02 | MANAGING |
| 009 | 00C | BRANCH OFFICE C | — | — | — | — | ... | — | WAITING |
| .... | .... | .... | .... | .... | .... | .... | .... | .... | .... |

COMMUNICATION SYSTEM INCLUDING INFORMATION PROCESSING APPARATUS AND MEDIATION APPARATUS CAPABLE OF TRANSMITTING COMMAND TO DEVICE IN APPROPRIATE ORDER

CROSS REFERENCE TO RELATED APPLICATION

This application claims priority from Japanese Patent Application No. 2018-077397 filed Apr. 13, 2018. The entire content of the priority application is incorporated herein by reference.

TECHNICAL FIELD

The present disclosure relates to a communication system for managing devices, a non-transitory computer-readable storage medium storing computer-readable instructions for managing devices, and a method for managing devices.

BACKGROUND

A conventional mobile device management (abbreviated herein as "MDM") system including a management server on the Internet that communicates with and manages mobile devices has been known. The mobile devices are terminal devices such as mobile phones or tablet or notebook type personal computers that can connect directly to the Internet and communicate with the management server.

SUMMARY

However, the conventional technology does not sufficiently describe how the MDM system manages devices that do not communicate directly with the management server.

In view of the foregoing, it is an object of the present disclosure to provide a technique of managing devices that do not communicate directly with a management server.

In order to attain the above and other objects, according to one aspect, the disclosure provides a communication system including: an information processing apparatus; a mediation apparatus; and a device. The information processing apparatus includes a first controller and a memory. The mediation apparatus includes a second controller. The information processing apparatus and the mediation apparatus are capable of communicating with each other via a firewall. The mediation apparatus and the device are capable of communicating with each other via a local network. The first controller is configured to perform: (a) storing a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device; (b) acquiring a plurality of instruction information, each of the plurality of instruction information including a device instruction and a device information, the device instruction being instruction for the device, the device information being indicative of the device; (c) identifying, for each of the plurality of instruction information, a device ID of the device and a mediation apparatus ID correlated to the identified device ID, the device ID being identified based on the device information, the mediation apparatus ID being identified using the correlation database; (d) generating a first command, a plurality of first commands being generated based on the plurality of instruction information, each of the plurality of first commands including the device instruction included in the corresponding each of the plurality of instruction information and the device ID of the device identified for the corresponding each of the plurality of instruction information; in response to a setup being performed by the mediation apparatus having the identified mediation apparatus ID, (e) transmitting, to the mediation apparatus having the identified mediation apparatus ID via the firewall, the plurality of first commands each generated in the (d) generating; and (f) receiving, via the firewall, a response to the plurality of first commands transmitted in the (e) transmitting. The second controller is configured to perform: (g) starting the setup to allow information transmitted from the first controller to be received by the second controller via the firewall; (h) receiving, via the firewall, the plurality of first commands transmitted in the (e) transmitting; (i) generating a second command, a plurality of second commands being generated based on the plurality of first commands, each of the plurality of second commands including the device instruction included in the corresponding each of the plurality of first commands; (j) transmitting, via the local network, the generated plurality of second commands to the device having the device ID included in the received plurality of first commands; and (k) transmitting, via the firewall, the response to the received plurality of first commands to the information processing apparatus. One of the first controller and the second controller is configured to further perform: (l) setting a transmission order for the plurality of second commands generated in the (i) generating, the plurality of second commands being transmitted to the device in the (j) transmitting in the set transmission order, the transmission order being set by setting a priority for the transmission order for each of the plurality of second commands. In a case where the (l) setting is performed by the first controller, the first controller sets the transmission order based on characteristics of the device instruction included in the plurality of first commands corresponding to the plurality of second commands. In a case where the (l) setting is performed by the second controller, the second controller sets the transmission order based on characteristics of the device instruction included in the plurality of second commands. The (j) transmitting includes: (j1) transmitting a second command of the plurality of second commands via the local network; and (j2) transmitting another second command of the plurality of second commands via the local network, the priority for the transmission order for the second command being higher than the priority for the transmission order for the another second command, the (j1) transmitting being performed before the (j2) transmitting is performed.

According to another aspect, the disclosure provides a non-transitory computer-readable storage medium storing a set of first computer-readable instructions for an information processing apparatus and a set of second computer-readable instructions for a mediation apparatus. The information processing apparatus is connected to the Internet. The information processing apparatus includes a first processor and a memory. The mediation apparatus is connected to a local network and includes a second processor. The mediation apparatus and the information processing apparatus are capable of communicating with each other via a firewall. The mediation apparatus is capable of communicating with a device via the local network. The set of first computer-readable instructions, when executed by the first processor, causes the information processing apparatus to perform: (a) storing a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device; (b) acquiring a plurality of instruction information, each of the plurality of instruction information including a device instruction and a device information, the device instruction being instruction for the device, the device information being indicative of the device; (c) identifying, for each of the plurality of instruction information, a device ID of the device and a mediation apparatus ID correlated to the identified device ID, the device ID being identified based on the device information, the mediation apparatus ID being identified using the correlation database; (d) generating a first command, a plurality of first commands being generated based on the plurality of instruction information, each of the plurality of first commands including the device instruction included in the corresponding each of the plurality of instruction information and the device ID of the device identified for the corresponding each of the plurality of instruction information; in response to a setup being performed by the mediation apparatus having the identified mediation apparatus ID, (e) transmitting, to the mediation apparatus having the identified mediation apparatus ID via the firewall, the plurality of first commands each generated in the (d) generating; and (f) receiving, via the firewall, a response to the plurality of first commands transmitted in the (e) transmitting. The set of second computer-readable instructions, when executed by the second processor, causes the mediation apparatus to perform: (g) starting the setup to allow information transmitted from the information processing apparatus to be received by the mediation apparatus via the firewall; (h) receiving, via the firewall, the plurality of first commands transmitted in the (e) transmitting; (i) generating a second command, a plurality of second commands being generated based on the plurality of first commands, each of the plurality of second commands including the device instruction included in the corresponding each of the plurality of first commands; (j) transmitting, via the local network, the generated plurality of second commands to the device having the device ID included in the received the plurality of first commands; and (k) transmitting, via the firewall, the response to the received plurality of first commands to the information processing apparatus. One of the set of first computer-readable instructions and the set of second computer-readable instructions, when executed by respective ones of the first processor and the second processor, causes the respective ones of the information processing apparatus and the mediation apparatus to further perform: (l) setting a transmission order for the plurality of second commands generated in the (i) generating, the plurality of second commands being transmitted to the device in the (j) transmitting in the set transmission order, the transmission order being set by setting a priority for the transmission order for each of the plurality of second commands. In a case where the (l) setting is performed by the information processing apparatus, the information processing apparatus sets the transmission order based on characteristics of the device instruction included in the plurality of first commands corresponding to the plurality of second commands. In a case where the (l) setting is performed by the mediation apparatus, the mediation apparatus sets the transmission order based on characteristics of the device instruction included in the plurality of second commands. The (j) transmitting includes: (j1) transmitting a second command of the plurality of second commands via the local network; and (j2) transmitting another second command of the plurality of second commands via the local network, the priority for the transmission order for the second command being higher than the priority for the transmission order for the another second command, the (j1) transmitting being performed before the (j2) transmitting is performed.

According to still another aspect, the disclosure provides a method for a communication system including an information processing apparatus, a mediation apparatus, and a device. The information processing apparatus includes a first controller and a memory. The mediation apparatus includes a second controller. The information processing apparatus and the mediation apparatus are capable of communicating with each other via a firewall. The mediation apparatus and the device are capable of communicating with each other via a local network. The method includes: (A) storing, using the first controller, a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device; (B) acquiring, using the first controller, a plurality of instruction information, each of the plurality of instruction information including a device instruction and a device information, the device instruction being instruction for the device, the device information being indicative of the device; (C) identifying, using the first controller, for each of the plurality of instruction information, a device ID of the device and a mediation apparatus ID correlated to the identified device ID, the device ID being identified based on the device information, the mediation apparatus ID being identified using the correlation database; (D) generating, using the first controller, a first command, a plurality of first commands being generated based on the plurality of instruction information, each of the plurality of first commands including the device instruction included in the corresponding each of the plurality of instruction information and the device ID of the device identified for the corresponding each of the plurality of instruction information; (E) starting, using the second controller, a setup to allow information transmitted from the first controller to be received by the second controller via the firewall; in response to the (E) starting being performed using the second controller of the mediation apparatus having the identified mediation apparatus ID, (F) transmitting, to the mediation apparatus having the identified mediation apparatus ID via the firewall using the first controller, the plurality of first commands each generated in the (D) generating; (G) receiving, via the firewall using the second controller, the plurality of first commands transmitted in the (F) transmitting; (H) generating, using the second controller, a second command, a plurality of second commands being generated based on the plurality of first commands, each of the plurality of second commands including the device instruction included in the corresponding each of the plurality of first commands; (I) transmitting, via the local network using the second controller, the generated plurality of second commands to the device having the device ID included in the received the plurality of first commands; (J) transmitting, via the firewall using the second controller, a response to the received plurality of first commands to the information processing apparatus; and (K) receiving, via the firewall using the first controller, the response to the plurality of first commands transmitted in the (J) transmitting. The method further includes: (L) setting, using one of the first controller and the second controller, a transmission order for the plurality of second commands generated in the (H) generating, the plurality of second commands being transmitted to the device in the (I) transmitting in the set transmission order, the transmission order being set by setting a priority for the transmission order for each of the plurality of second commands. In a case where the (L) setting is performed using the first controller, the first controller sets the transmission order based on characteristics of the device instruction included in the plurality of first commands corresponding to the plurality of second commands. In a case where the (L) setting is performed using the second controller, the second controller sets the transmission order based on characteristics of the device instruction included in the plurality of second commands. The (I) transmitting includes: (I1) transmitting a second command of the plurality of second commands via the local network; and (I2) transmitting another second command of the plurality of second commands via the local network, the priority for the transmission order for the second command being higher than the priority for the transmission order for the another second command, the (I1) transmitting being performed before the (I2) transmitting is performed.

BRIEF DESCRIPTION OF THE DRAWINGS

The particular features and advantages of the embodiment(s) as well as other objects will become apparent from the following description taken in connection with the accompanying drawings, in which:

FIG. 2 illustrates a correlation database stored in a data storage area of an outside mediation apparatus in the management system according to the embodiment;

DETAILED DESCRIPTION

Hereinafter, a management system 10 as an example of a communication system according to one embodiment of the present disclosure will be described with reference to FIGS. 1 to 7. Note that the embodiment described below is merely an example of the present disclosure and may be modified in many ways without departing from the scope of the disclosure. For example, the order in which the processes described below are executed may be modified where appropriate.

Figure 1:
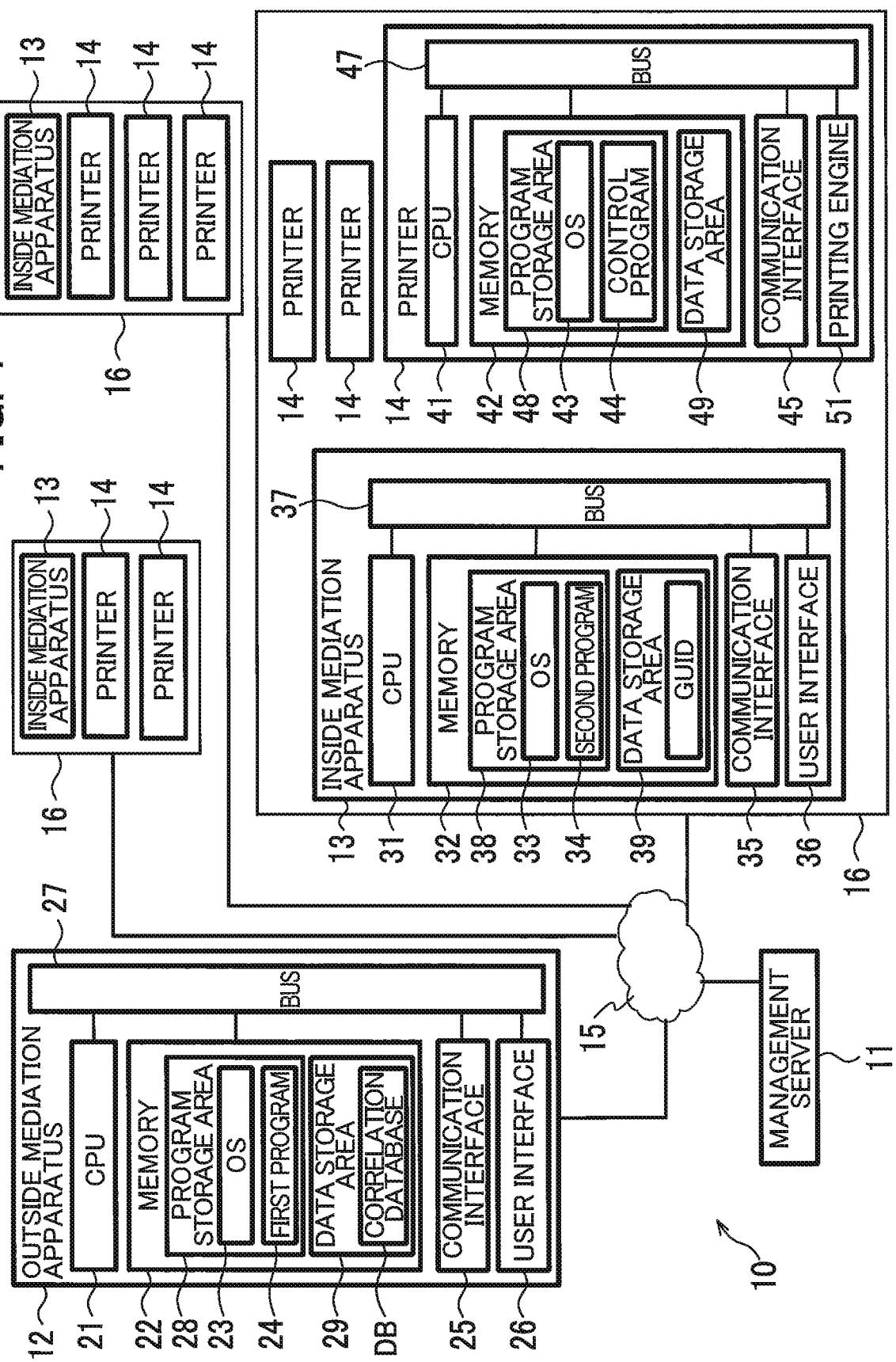
FIG. 1 is a conceptual diagram illustrating a configuration of a management system according to one embodiment of the present disclosure.

FIG. 1 illustrates the management system 10 according to the embodiment. The management system 10 is provided with a management server 11, an outside mediation apparatus 12, inside mediation apparatuses 13, and printers 14. The management server 11 and the outside mediation apparatus 12 are connected to the Internet 15. The inside mediation apparatuses 13 and the printers 14 are connected to local area networks 16. The outside mediation apparatus 12 is an example of the information processing apparatus. The inside mediation apparatuses 13 are an example of the mediation apparatus. The printers 14 are an example of the device.

The management system 10 employs a mobile device management system (hereinafter abbreviated as "MDM system") system to manage the printers 14. An administrator of the outside mediation apparatus 12 for managing the printers 14 can view management information on the printers 14 stored on the management server 11 using a browser, or can instruct changes or the like to settings information for the printers 14 through the management server 11. Note that an operator who operates the printer 14 can also view the management information for the printers 14 stored on the management server 11 using a browser.

The management system 10 also manages the printers 14 that do not possess a function to communicate directly with the management server 11 (for example, a function to connect to an Internet 15). The management server 11 uses the outside mediation apparatus 12 and the inside mediation apparatuses 13 to manage the printers 14 without a function to communicate directly with the management server 11.

The management server 11 belongs to a company that provides a service for managing mobile devices (hereinafter, sometimes referred to as "MDM service"), for example. The outside mediation apparatus 12 belongs to a company that uses this MDM service, for example. The inside mediation apparatuses 13 are servers or personal computers deployed at branch offices of the company utilizing the MDM service, for example. The local area network 16 is configured at each of these company branches, for example. Each of the branch offices possesses one or more printers 14. The printers 14 at each of the branch offices are connected to the local area network 16 provided at that branch office.

The example in FIG. 1 illustrates three local area networks 16 configured at corresponding branches, and two or three printers 14 connected to each of the three local area networks 16. However, the number of local area networks 16 included in the management system 10 and the number of printers 14 connected to each local area network 16 are not limited to the numbers in this example.

The management server 11 and the outside mediation apparatus 12 can communicate with each other through the Internet 15. More specifically, the management server 11 and the outside mediation apparatus 12 each have a global IP address and communicate with each other using the Internet Protocol, which employs global IP addresses.

The local area network 16 is an intranet that is configured of a wired LAN, a wireless LAN, a WAN, or a combination of these, for example. The inside mediation apparatus 13 and the printers 14 connected to the corresponding local area network 16 can communicate with each other using a communication protocol such as TCP/IP. More specifically, the inside mediation apparatus 13 and the printers 14 communicate with each other using private IP addresses or MAC addresses.

Each of the local area networks 16 has a gateway device (not illustrated) such as a router. The gateway device has a global IP address and is connected to the Internet 15. The inside mediation apparatus 13 connected to each local area network 16 communicates with the outside mediation apparatus 12 via the gateway device. Specifically, the inside mediation apparatus 13 and the outside mediation apparatus 12 communicate with each other via a firewall configured by the gateway device.

Here, the outside mediation apparatus 12 is a mediation apparatus located outside the firewall, and each of the inside mediation apparatuses 13 is a mediation apparatus located inside the firewall. In this example, the inside mediation apparatus 13 is a local mediation apparatus located in each local area network 16 for mediating communications between the outside mediation apparatus 12 and the printers 14 located in the local area network 16, and the outside mediation apparatus 12 is a global mediation apparatus for mediating communications between the management server 11 and the inside mediation apparatuses 13.

The management system 10 uses the outside mediation apparatus 12 and the inside mediation apparatuses 13 having the constructions described above to enable the management server 11 to manage printers 14 that do not possess a function for communicating directly with the management server 11. Specifically, a first program 24 installed and executed on the outside mediation apparatus 12, and a second program 34 installed and executed on each inside mediation apparatus 13 are used to manage the printers 14 without a function to communicate directly with the management server 11. Next, configurations of the outside mediation apparatus 12, the inside mediation apparatuses 13, and the printers 14 will be described in greater detail. The first program 24 is an example of the first set of computer-readable instructions. The second program 34 is an example of the second set of computer-readable instructions.

The outside mediation apparatus 12 is provided with a CPU 21, a memory 22, a communication interface 25, a user interface 26, and a communication bus 27. The CPU 21, the memory 22, the communication interface 25, and the user interface 26 are connected to the communication bus 27. The CPU 21 is examples of the first controller and the first processor.

The memory 22 may be configured of ROM, RAM, EEPROM, a hard disk drive, a portable storage medium such as USB memory, or a buffer provided in the CPU 21. The memory 22 may be a computer-readable storage medium (storage medium that can be read by a computer). The computer-readable storage medium is a non-transitory medium. In addition to the above example, non-transitory media include a recording medium such as CD-ROM, DVD-ROM, and the like. The non-transitory medium is also a tangible medium.

On the other hand, electric signals that convey programs downloaded from a server or the like on the Internet are a computer-readable signal medium, which is one type of computer-readable medium but is not considered a non-transitory computer-readable storage medium. This description also applies to a memory 32 (described later) provided in each of the inside mediation apparatuses 13 and a memory 42 (described later) provided in each of the printers 14. The "non-transitory computer-readable storage medium" may denote a single non-transitory computer-readable storage medium, or denote combination of a plurality of non-transitory computer-readable storage media.

The memory 22 has a program storage area 28 and a data storage area 29. The program storage area 28 stores an operating system (hereinafter, abbreviated as "OS") 23, the first program 24, and other programs.

The OS 23 is a basic program of the outside mediation apparatus 12. The OS 23 is any operating system such as Mac OS (registered trademark), Windows (registered trademark), Linux (registered trademark), or Android (registered trademark).

The first program 24 controls communications with the management server 11 and the inside mediation apparatuses 13 via the communication interface 25 in cooperation with the OS 23. The first program 24 may be a single program or an aggregate of programs. The process executed in accordance with the first program 24 will be described later.

The data storage area 29 stores data required for executing programs. The data storage area 29 also stores a correlation database DB illustrated in FIG. 2.

As illustrated in FIG. 2, the correlation database DB has a plurality of records, each of which is a collection of a plurality of fields. The plurality of fields corresponds to respective ones of a plurality of items including: "Device ID", "GUID (the abbreviation of "Globally Unique Identifier")", "Location Information", "Firmware Version", "Settings Information", "Modified Date", and "Condition Information". Each of the plurality of records in the correlation database may include fields corresponding to items other than those described above. Hereinafter, each of the plurality of fields may be simply referred to by the name of the corresponding item.

The item "Device ID" specifies an identification information assigned to each printer 14 that is used to identify the printer 14. The device ID may be a MAC address, an IP address, or a serial number for the printer 14, for example. The device ID is used to differentiate individual records in the correlation database DB. In other words, a single record is generated for each printer 14.

The item "GUID" specifies the inside mediation apparatus 13 to which the printer 14 identified by the device ID belongs. "The inside mediation apparatus 13 to which the printer 14 belongs" denotes the inside mediation apparatus 13 that is connected to the same local area network 16 to which the printer 14 is connected. The item "GUID" specifies identification information (i.e., an ID) assigned to the second program 34 for identifying the second program 34. Note that a single second program 34 is installed for each inside mediation apparatus 13. Therefore, the GUID may be considered identification information assigned to the inside mediation apparatus 13. Here, numbers, letters, or any other characters or the like capable of identifying the inside mediation apparatus 13 (i.e., the second program 34) may be used as the GUID. The same is true for the device ID. The GUID is an example of the mediation apparatus ID.

The item "Location Information" specifies the local area network 16 to which the inside mediation apparatus 13 designated by the item "GUID" is connected. The item "Location Information" may be a branch name, for example.

The item "Firmware Version" specifies the version of a control program 44 (described later) installed on each printer 14. Note that larger numbers in the item "Firmware Version" indicate newer versions.

The item "Settings Information" specifies parameters set for the printer 14. The item "Settings Information" is subdivided into a plurality of items including "Font", "Font Size", and "Density". The item "Font" indicates the font for characters printed by the printer 14. The item "Font Size" indicates the size of characters printed by the printer 14. The item "Density" indicates the density of ink that the printer 14 uses to print text and graphics. In addition to these items, the item "Settings Information" may include other items, such as an item specifying whether the automatic power-off function is enabled or disabled, an item specifying the printing speed, and an item specifying parameters for communication.

The item "Modified Date" indicates the date at which content for any item in the record was last modified. The item may include "Modified Date and Time" instead of "Modified Date". In this case, the item "Modified Date and Time" indicates the date and time at which content for any item in the record was last updated.

The item "Condition Information" indicates whether the printer 14 corresponding to the record is under management of the management system 10. For this item, "Managing" denotes that the printer 14 is currently under the management of the management system 10, while "Waiting" denotes that the printer 14 is not currently under the management of the management system 10.

The communication interface 25 of the outside mediation apparatus 12 illustrated in FIG. 1 is provided for communicating with the management server 11 and the inside mediation apparatuses 13. The communication interface 25 is a LAN interface or a wireless LAN interface. The outside mediation apparatus 12 communicates with each inside mediation apparatus 13 via the communication interface 25, the Internet 15, the firewall, the local area network 16, and a communication interface 35 (described later) of the inside mediation apparatus 13.

The user interface 26 includes a keyboard, a mouse, and the like. The user interface 26 accepts input from the administrator of the outside mediation apparatus 12.

Each of the inside mediation apparatuses 13 is provided with a CPU 31, the memory 32, the communication interface 35, a user interface 36, and a communication bus 37. The CPU 31, the memory 32, the communication interface 35, the user interface 36, and the communication bus 37 have configurations identical to those of the CPU 21, the memory 22, the communication interface 25, the user interface 26, and the communication bus 27. The CPU 31 is examples of the second controller and the second processor.

The memory 32 has a program storage area 38 and a data storage area 39. The program storage area 38 stores programs such as an OS 33, and the second program 34. The data storage area 39 stores data required for executing the programs. The data storage area 39 also stores a GUID used to identify the inside mediation apparatus 13 having the data storage area 39 itself.

The OS 33 is a basic program for the inside mediation apparatus 13. The second program 34 controls communications with the outside mediation apparatus 12 and the printers 14 via the communication interface 35 in cooperation with the OS 33. The second program 34 may be a single program or an aggregate of programs. The process executed in accordance with the second program 34 will be described later.

The communication interface 35 is an interface for communicating with the outside mediation apparatus 12 and the printers 14. The communication interface 35 is a LAN interface or a wireless LAN interface.

Each printer 14 is provided with a CPU 41, the memory 42, a communication interface 45, a printing engine 51, and a communication bus 47. The CPU 41, the memory 42, the communication interface 45, and the communication bus 47 have the same configurations as the CPU 21, the memory 22, the communication interface 25, and the communication bus 27.

The memory 42 has a program storage area 48 and a data storage area 49. The program storage area 48 stores programs such as an OS 43, and the control program 44. The data storage area 49 stores data required for executing the programs. The data storage area 49 also stores a device ID for identifying the printer 14.

The OS 43 is a basic program for the printer 14. In cooperation with the OS 43, the control program 44 controls the printing engine 51 to execute printing and controls communications with the inside mediation apparatus 13 via the communication interface 45. The control program 44 may be a single program or an aggregate of programs. The process executed in accordance with the control program 44 will be described later. The control program 44 is an example of the device program.

The communication interface 45 can communicate with the inside mediation apparatus 13. The communication interface 45 receives commands from the inside mediation apparatus 13 and transmits responses to these commands to the inside mediation apparatus 13.

In general, sequence diagrams in this specification depict steps performed by the CPUs 21, 31, and 41 according to instructions described in programs. In other words, actions such as "determine", "extract", "select", "calculate", "decide", "identify", "acquire", "receive", "control", and "set" the like in the following description represent steps performed by the CPUs 21, 31, and 41. Processes performed by the CPU include processes that control hardware through the OS.

Note that "Acquiring" is used as a concept which does not necessarily require a request. That is, a concept represented by "the CPU acquires data" includes a process in which the CPU acquires data without requesting thereof. Further, "data" in this specification represents bit strings that a computer can read. Further, data of different formats are treated as the same data when the content of the data is essentially the same. The same holds true for "information" in this specification. The processes for "instruction", "command", "response", and "request" are executed by communicating (e.g., transmitting) respective information indicating "instruction", "command", "response", and "request". The words "instruction", "command", "response", and "request" may respectively indicate information indicating "instruction", "command", "response", and "request".

Further, processes performed by the CPU according to instructions described in a program may be described in abbreviated terms, such as "the CPU 21 executes", "the first program 24 executes" or "the outside mediation apparatus 12 executes". The same holds true for the CPUs 31 and 41. Similarly, the input and the output of information performed by a program via a communication interface or a user interface may be described in abbreviated terms, such as "the CPU 21 receives", "the first program 24 transmits", or "the outside mediation apparatus 12 acquires".

Further, a process performed by the CPU to determine whether information A indicates circumstance B may be described conceptually as "determining whether circumstance B based on information A". A process in which the CPU determines whether information A indicates circumstance B or circumstance C may be described conceptually as "determining whether circumstance B or circumstance C based on information A".

The terms "data" and "information" used in this specification share aspects of being bits or bit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, "execute process A in response to" in this specification indicates that process A is to be executed when the condition specified after the phrase "in response to" has been met. Note that the timing at which process A is executed should be after the condition has been met, but need not be immediately after the condition is met.

Next, processes executed by the first program 24 of the outside mediation apparatus 12, the second program 34 of the inside mediation apparatus 13, and the control program 44 of the printer 14 will be described with reference to FIGS. 3 to 7.

Note that the firewall blocks data transmissions from the outside mediation apparatus 12 to the inside mediation apparatus 13 other than HTTP responses which are responses to the HTTP requests received from the inside mediation apparatus 13. Therefore, when the Internet-side apparatuses located outside the firewall (i.e., the management server 11 and the outside mediation apparatus 12) transmit a request or instruction (i.e., an instruction included in a first command) for the intranet-side apparatuses located inside the firewall (i.e., the inside mediation apparatus 13 and the printer 14) via the firewall, the request or instruction needs to be transmitted as a response to an HTTP request issued by the inside mediation apparatus 13. Hence, in order to enable the request or instruction to be transmitted as a response to an HTTP request, i.e., in order to enable the Internet-side apparatuses to transmit the request or instruction to the intranet-side apparatuses via the firewall, the inside mediation apparatus 13 periodically transmits an HTTP request to the outside mediation apparatus 12 in S36. In other words, in the present embodiment, the inside mediation apparatus 13 performs set-up operations or preparations for enabling the Internet-side apparatuses to transmit the request or instruction to the intranet-side apparatuses via the firewall. However, the set-up operations are not limited to the periodic HTTP request transmissions described above and any method or process can be used provided that the Internet-side apparatuses can transmit the request or instruction to the intranet-side apparatuses via the firewall.

First, the process of recording the device ID of the printer 14 in the correlation database DB stored in the memory 22 of the outside mediation apparatus 12 and initiating management of the recorded printer 14 on the management system 10 will be described with reference to FIG. 3.

Figure 3:
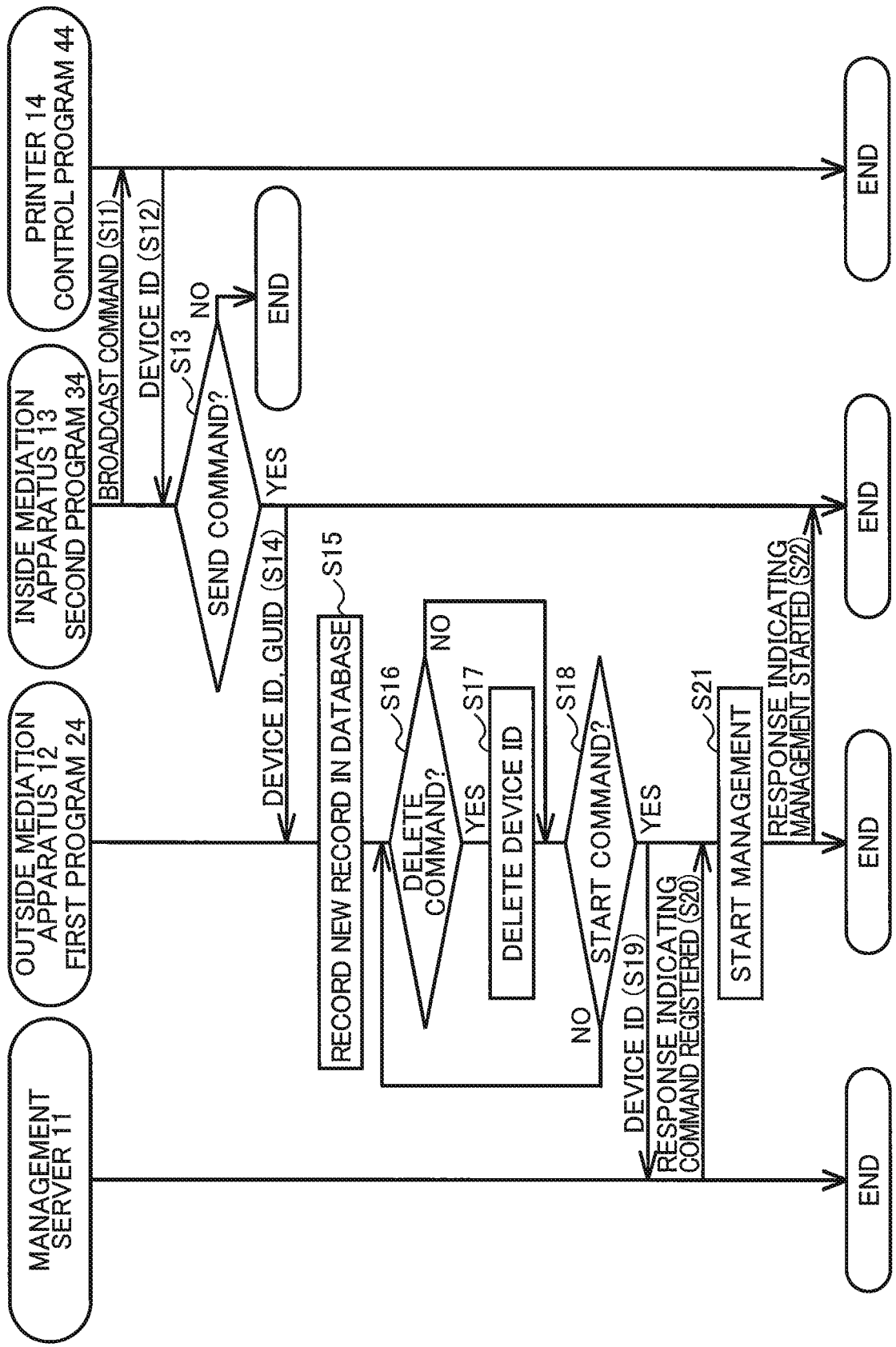
FIG. 3 is a sequence diagram illustrating a process executed by a management server, the outside mediation apparatus, an inside mediation apparatus, and a printer in the management system according to the embodiment, the process being executed for recording a device ID of the printer and a GUID of the inside mediation apparatus in the management server.

In S11 of FIG. 3 the second program 34 of the inside mediation apparatus 13 broadcasts a command over the local area network 16 requesting printers 14 to return (or transmit) their device IDs. For example, when the second program 34 is started for the first time, the second program 34 executes an initial setup. During this initial setup, the operator of the inside mediation apparatus 13 may issue a registration command to register all printers 14 to be managed on the management system 10. Alternatively, the second program 34 of the inside mediation apparatus 13 may broadcast the command for printers 14 to return their device IDs in response to such a registration command issued during this initial setup or in response to a registration command received from the first program 24 of the outside mediation apparatus 12. The registration command may be a command to add a printer 14 to a management system 10 already in existence, i.e., to register a printer 14 in the management system 10.

The "operator" is a person that manages the printer 14 at the corresponding branch office, for example, and not the administrator that operates the outside mediation apparatus 12. In other words, the operator is a person that manages devices in the local area network 16 such as the printers 14 and the inside mediation apparatus 13, and the administrator is a person that manages devices outside the firewall such as the outside mediation apparatus 12.

As will be described later in detail, the outside mediation apparatus 12 transmits an HTTP response that includes information such as a command to the inside mediation apparatus 13 in response to an HTTP request received from the inside mediation apparatus 13.

In S11 the printers 14 connected to the same local area network 16 over which the second program 34 of the inside mediation apparatus 13 broadcast the command in Si 1 receive this command, and in S12 the control program 44 of each printer 14 receiving the command returns a response that includes the device ID of the printer 14 itself.

In S12 the second program 34 of the inside mediation apparatus 13 receives the response from the control program 44 of each printer 14. In S13 the second program 34 determines whether a send command has been inputted. For example, upon receiving a response including the device ID of a printer 14, the second program 34 displays the received device ID on the display of the inside mediation apparatus 13. The operator of the inside mediation apparatus 13 determines whether the device ID displayed on the display is the device ID of a printer 14 targeted for management, and inputs a send command into the inside mediation apparatus 13 when determining that the device ID displayed on the display is the device ID of a printer 14 to be managed.

On the other hand, when the operator determines that the device ID does not belong to a printer 14 targeted for management, the operator inputs into the inside mediation apparatus 13 a command to delete the device ID received from each printer 14 (i.e., a command not to send the received device ID). In other words, the operator of the inside mediation apparatus 13 at each branch office confirms whether each device ID collected through the broadcast is the device ID of a printer 14 to be managed with the management system 10.

When the second program 34 of the inside mediation apparatus 13 determines that a command not to send any of the collected device ID was inputted (S13: NO), the second program 34 ends the process without transmitting any of the collected device IDs to the outside mediation apparatus 12. The second program 34 may determine that the command not to send any of the collected device ID was inputted when no send command to send any of the collected device IDs was inputted.

On the other hand, when the second program 34 determines that a send command was inputted (S13: YES), in S14 the second program 34 transmits an HTTP request to the outside mediation apparatus 12. The HTTP request transmitted in S14 includes the collected device IDs and its own GUID stored in the memory 32. When a plurality of device IDs was collected, each device ID may be transmitted individually to the outside mediation apparatus 12, or all of the collected device IDs may be transmitted to the outside mediation apparatus 12 at once.

In S14 the outside mediation apparatus 12 receives the HTTP request including the device ID(s) and the GUID from the second program 34 of the inside mediation apparatus 13. Upon receiving the device ID(s) and the GUID, in S15 the first program 24 of the outside mediation apparatus 12 determines whether the received device ID(s) are already recorded in the correlation database DB, and records a new record including the device ID and the GUID in the correlation database DB when determining that the device ID(s) have not been recorded in the correlation database DB.

Although not illustrated in the sequence diagram of FIG. 3, the first program 24 of the outside mediation apparatus 12 also returns an HTTP response to the inside mediation apparatus 13 in response to the HTTP request received in S14. The HTTP response includes information indicating that the device ID(s) have been received. Alternatively, the first program 24 of the outside mediation apparatus 12 may transmit an HTTP response that includes all device IDs that have been newly recorded in the correlation database DB to the inside mediation apparatus 13 in response to the HTTP request received in S14. In response to receiving an HTTP response that includes device IDs that were recorded in the correlation database DB, the second program 34 of the inside mediation apparatus 13 stores the device IDs included in this HTTP response in the memory 32 on the inside mediation apparatus 13. The second program 34 displays the device IDs stored in the memory 32 on the display of the inside mediation apparatus 13 when the HTTP response is received or in response to a command inputted by the operator. In this way, the operator can confirm the device IDs that are recorded in the correlation database DB from the device IDs displayed on the display.

When a new record is added to the correlation database DB, the initial value "Waiting" is stored under the item "Condition Information" of the new record. In the example illustrated in FIG. 2, the record for a printer 14 having device ID "009" is a newly added record. Printers 14 having records whose Condition Information is "Waiting" have not yet been registered on the management server 11. These printers 14 are not yet under the management of the management system 10 and can be said to be in a provisional registration state. The item "Condition Information" in records for the printers 14 under management has been changed from "Waiting" to "Managing".

Note that, when one of the received device IDs has already been registered in the correlation database DB, the first program 24 of the outside mediation apparatus 12 transmits a response to the inside mediation apparatus 13 indicating that the device ID is already registered.

In S16 the first program 24 of the outside mediation apparatus 12 determines whether a delete command to delete a record in the correlation database DB has been inputted. The delete command may be a command that the administrator inputs on the outside mediation apparatus 12, for example. When a new record is generated, the first program 24 displays information on the display of the outside mediation apparatus 12 indicating that a new record was generated and recorded in the correlation database DB, for example. When seeing this display, the administrator may display the correlation database DB on the display of the outside mediation apparatus 12 and determine whether printers 14 whose item "Condition information" in the record indicates "Waiting" are printers 14 to be targeted for management. The administrator inputs a delete command for the device ID(s) of printers 14 not to be managed with the management system 10. In other words, the operator of each inside mediation apparatus 13 confirms whether the device ID(s) should be recorded in the correlation database DB, and subsequently the administrator of the outside mediation apparatus 12 confirms whether these device ID(s) should be recorded in the correlation database DB.

Note that the process in S13 performed by the second program 34 may be omitted so that only the administrator of the outside mediation apparatus 12 confirms whether device ID(s) should be recorded in the correlation database DB. In other words, the second program 34 may transmit all of the device IDs received from printers 14 to the outside mediation apparatus 12 without receiving confirmation (i.e., input of a send command) from the operator of the inside mediation apparatus 13.

When the first program 24 of the outside mediation apparatus 12 determines that a delete command was inputted (S16: YES), in S17 the first program 24 deletes the record designated by the delete command from the correlation database DB. On the other hand, when the first program 24 determines that a delete command was not inputted (S16: NO), the first program 24 skips the process in S17.

In S18 the first program 24 determines whether a management start command for initiating management of printers 14 on the management system 10 has been inputted by the administrator. When a management start command has not been inputted (S18: NO), the first program 24 returns to the process in S16. The first program 24 may continue to wait while a management start command was not inputted (S18: NO).

When the first program 24 determines that a management start command has been inputted (S18: YES), in S19 the first program 24 transmits a command to the management server 11. This command includes the device IDs that have been newly recorded in the correlation database DB as accompanying information. This command also requests the management server 11 to register therein the accompanying device IDs as device IDs for printers 14 under management.

Note that, in S18 the first program 24 of the outside mediation apparatus 12 may also receive an input of a command declining to initiate management. In this case, the first program 24 skips the process of S19 to S21 and in S22 transmits an HTTP response to the second program 34 of the inside mediation apparatus 13. The HTTP response includes the command for declining to initiate management. Upon receiving this HTTP response, the second program 34 displays information on the display of the inside mediation apparatus 13 indicating that a command declining to initiate management was inputted on the outside mediation apparatus 12. Based on this information displayed on the display, the operator of the inside mediation apparatus 13 can confirm that such a command was inputted on the outside mediation apparatus 12.

In S19 the management server 11 receives the command transmitted from the outside mediation apparatus 12. Upon receiving the command, the management server 11 stores the device ID(s) included in the command in a memory (not illustrated). In other words, the management server 11 registers the device ID(s) included in the command as device ID(s) for printers 14 under management. In S20 the management server 11 transmits a response to the outside mediation apparatus 12 via the Internet 15 indicating that the device ID(s) included in the command have been registered.

In S20 the outside mediation apparatus 12 receives the response from the management server 11. Upon receiving this response from the management server 11, in S21 the first program 24 of the outside mediation apparatus 12 starts management on the management system 10. More specifically, the first program 24 changes the "Condition Information" in the records for the printers 14 under management indicated in the correlation database DB illustrated in FIG. 2 from "Waiting" to "Managing", and executes the process in S22.

In S22 the first program 24 of the outside mediation apparatus 12 transmits an HTTP response to the inside mediation apparatus 13 in response to one of HTTP requests periodically received from the inside mediation apparatus 13. The HTTP response transmitted to the inside mediation apparatus 13 includes the device IDs in records whose "Condition Information" has been changed from "Waiting" to "Managing," in S21, i.e., the device IDs for printers 14 for which management has been newly initiated. At this time, the first program 24 does not transmit device IDs that were deleted in S17.

Note that the first program 24 of the outside mediation apparatus 12 may also transmit the HTTP response to the inside mediation apparatus 13 in S22 as a response to the HTTP request received in S14. In this case, the processes in S16 and S17 are preferably omitted to avoid the occurrence of a timeout.

Although not illustrated in the sequence diagram, the second program 34 of the inside mediation apparatus 13 stores the device ID(s) of the printers 14 for which management has been initiated in the memory 32 upon receiving such device ID(s) in S22. The second program 34 notifies the operator of the inside mediation apparatus 13 that the device ID(s) has been received for printers 14 newly under management by displaying the information on the display of the inside mediation apparatus 13 indicating that the second program 34 receives the device ID(s). The operator can confirm the printers 14 for which management has begun by displaying the device ID(s) stored in the memory 32 on the display of the inside mediation apparatus 13.

Note that the administrator of the outside mediation apparatus 12 can also confirm the printers 14 for which management has begun by displaying the correlation database DB stored in the memory 22 on the display of the outside mediation apparatus 12. Additionally, both the operator of the inside mediation apparatus 13 and the administrator of the outside mediation apparatus 12 can confirm printers 14 for which management has begun by using a browser to display data stored in the management server 11 on a display of a device such as a terminal device, a PC and the outside mediation apparatus 12.

Note that, after the first program 24 determines that a management start command has been inputted (S18: YES), the following processes may be performed by the management server 11 and the first program 24 of the outside mediation apparatus 12, instead of the process in S19 and S20. Specifically, the first program 24 may transmit an HTTP request to the management server 11 including a notification indicating that there is one or more new devices (printers 14) to be managed by the management server 11. Upon receiving this HTTP request from the first program 24, the management server 11 transmits an HTTP response to the first program 24 indicating that the notification has been received. Further, the management server 11 transmits an HTTP request to the first program 24 requesting to transmit the device ID(s) of the printer(s) 14 that is to be managed. In response to the received HTTP request, the first program 24 transmits an HTTP response to the management server 11 including the device ID(s) of the printer(s) 14 to be managed with the management system 10.

In response to receiving instructions from the management server 11, commands in accordance with the received instructions are inputted into printers 14 having device IDs in records whose item "Condition Information" indicates "Managing". In other words, the management server 11 manages these printers 14. This management of the printers 14 by the management server 11 will be described in greater detail with reference to FIGS. 4 and 5. Note that the administrator inputs instructions into the management server 11 through a browser.

Figure 4:
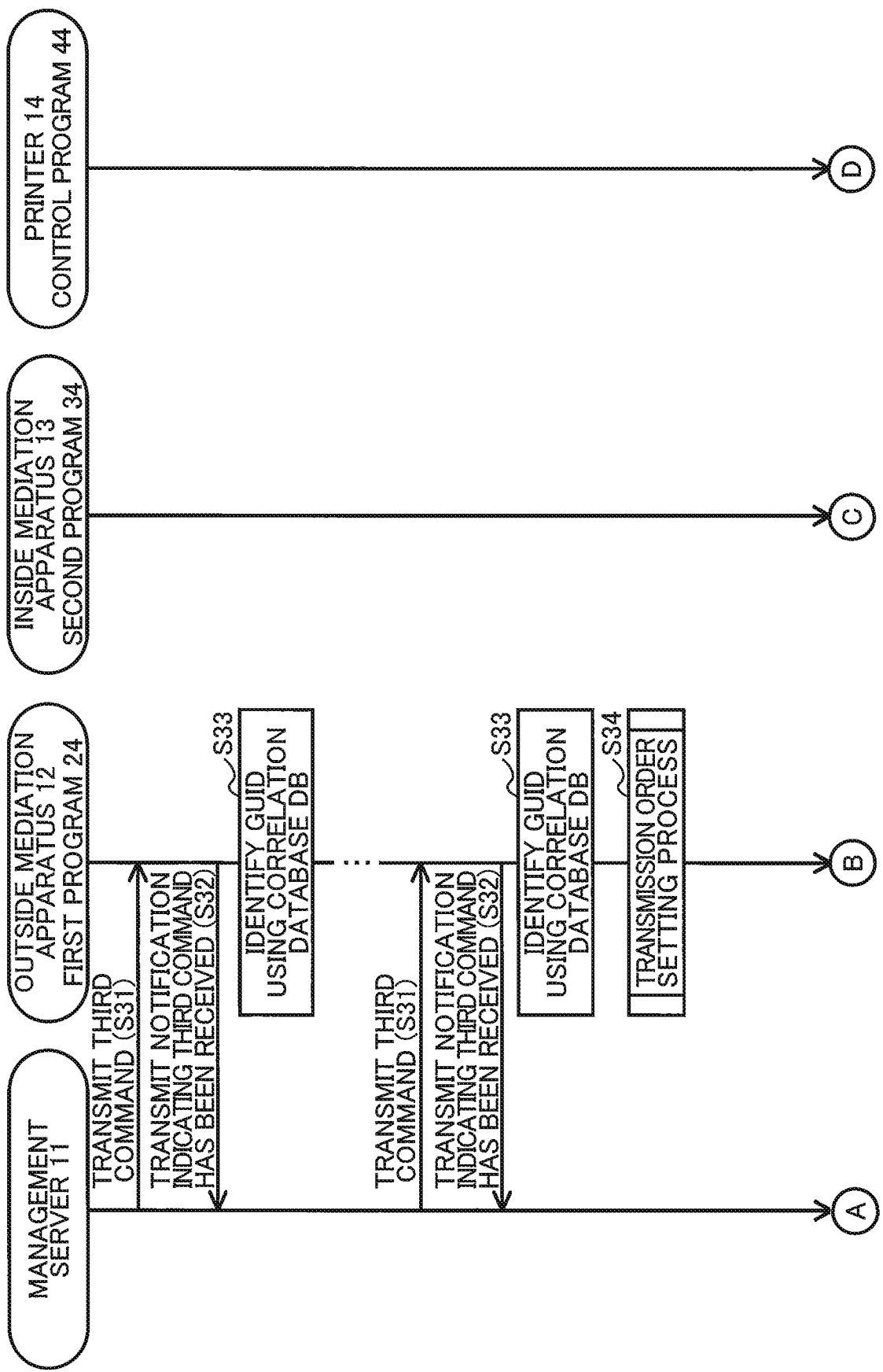
FIG. 4 is a sequence diagram illustrating a first part of a process executed by the management server, the outside mediation apparatus, the inside mediation apparatus, and the printer in the management system according to the embodiment, the process being executed for instructing the printer to execute a command from the management server.

In S31 of FIG. 4, the management server 11 transmits a third command to the outside mediation apparatus 12 via the Internet 15. The third command is a command directing the outside mediation apparatus 12 to execute instructions instructing the printer 14 to execute processes. The third command includes a device ID, as accompanying information, used to identify the printer 14 that will execute the processes according to the third command.

The third command directs the outside mediation apparatus 12 to execute instructions for modifying settings in a printer 14 for at least one of the items "Font," "Font Size," or "Density" in the settings information (see FIG. 2), instructions for updating the firmware version for the control program 44 of a printer 14 (see FIG. 2), or instructions for requesting a printer 14 to return current settings information, for example. However, the contents of instructions directed to the outside mediation apparatus 12 specified by the third command is not limited to that described above. The contents of the instruction specified by the third command is an example of the device instruction. The instruction for updating the firmware version for the control program 44 is an example of the version update information. The instruction for modifying settings in the printer 14 is an example of the settings modification information.

In S31 the first program 24 of the outside mediation apparatus 12 receives the third command transmitted from the management server 11.

In response to receiving the third command in S31, in S32 the first program 24 of the outside mediation apparatus 12 transmits to the management server 11 a notification indicating that the third command has been received.

Incidentally, the management server 11 may include third commands in an HTTP request, and may transmit this HTTP request to the first program 24. In this case, upon receiving the HTTP request including the third commands, the first program 24 transmits to the management server 11 an HTTP response indicating that the HTTP request including the third commands has been received.

After receiving the third command, in S33 the first program 24 of the outside mediation apparatus 12 identifies the GUID correlated to the device ID included in the third command by referencing the correlation database DB. In other words, by identifying the GUID, the first program 24 identifies the inside mediation apparatus 13 on the local area network 16 to which the target printer 14 which should execute the process specified by the third command belongs. More specifically, the first program 24 identifies the record in the correlation database DB that has the device ID included in the third command and acquires the corresponding GUID under the item "GUID" in the identified record.

Each time the first program 24 receives a third command, the first program 24 executes the process in S32 and S33. The first program 24 executes a transmission order setting process in S34 on a plurality of third commands having the same GUID identified in S33. The first program 24 executes this transmission order setting process on the third commands inputted prior to receiving an HTTP request that is transmitted periodically from the inside mediation apparatus 13 (S36), for example.

Alternatively, the first program 24 may execute the transmission order setting process at prescribed time intervals. In other words, the first program 24 may execute the transmission order setting process on the third commands inputted within the prescribed time interval.

Next, the transmission order setting process will be described in detail with reference to FIG. 7. In the present embodiment, the transmission order setting process is a process for generating first commands based on the received third commands, and for setting a priority for a transmission order for each of the generated first commands to one of "transmission order A", "transmission order B", and "transmission order C" in accordance with the characteristics of instructions specified by each of the third commands Based on the priority for the transmission order set as described above, the first program 24 sets a transmission order for transmitting the generated first commands.

Figure 7:
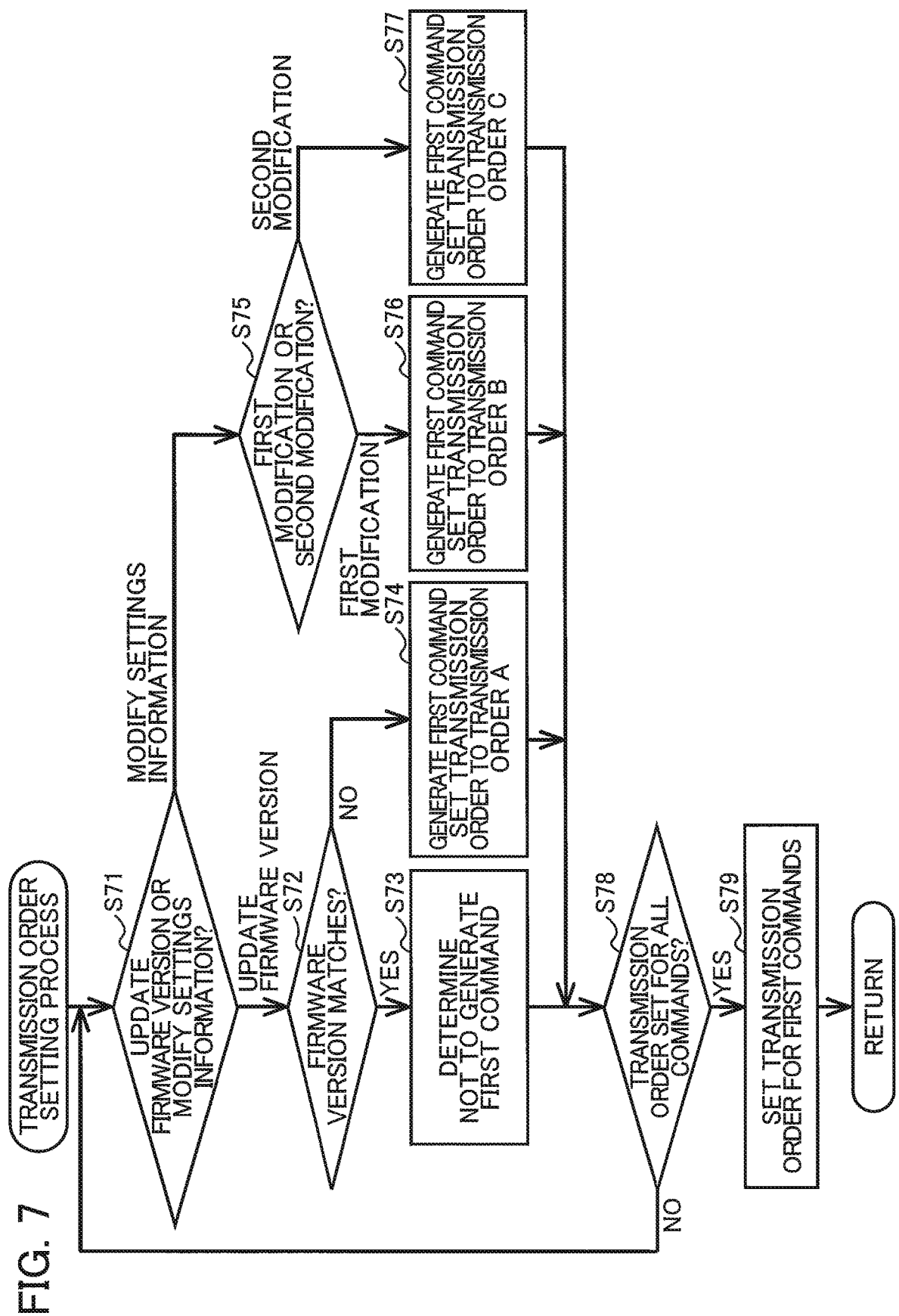
FIG. 7 is a flowchart illustrating steps in a transmission order determination process executed by a CPU of the outside mediation apparatus in the management system according to the embodiment.

In S71 of FIG. 7, the first program 24 of the outside mediation apparatus 12 first determines whether the third command specifies an instruction to update the firmware version of the control program 44, or an instruction to modify settings information of the printer 14. When the first program 24 determines that the third command specifies an instruction to update the firmware version of the control program 44 (S71: Update Firmware Version), in S72 the first program 24 determines whether the current firmware version of the control program 44 matches the firmware version indicated in the third command. Specifically, the first program 24 identifies the record in the correlation database DB (see FIG. 2) that includes the device ID provided in the third command, and acquires the firmware version in the identified record as the current firmware version of the control program 44. That is, the first program 24 determines whether the acquired firmware version matches the firmware version specified in the third command.

When the first program 24 of the outside mediation apparatus 12 determines that the current firmware version of the control program 44 does not match the firmware version specified in the third command (S72: NO), in S74 the first program 24 generates a first command and sets the priority for the transmission order for the generated first command to "transmission order A". The first command is generated in accordance with an instruction specified in the third command and transmitted to the inside mediation apparatus 13. The first command includes a device ID specified in the third command as accompanying information.

Although not illustrated in FIG. 1, the data storage area 29 in the memory 22 of the outside mediation apparatus 12 stores a first command list. The first command list specifies correlations between first commands and third commands. The first program 24 of the outside mediation apparatus 12 generates a first command by selecting from the first command list a first command that corresponds to the third command received from the management server 11 in S31 (see FIG. 4), and by adding the device ID specified in the third command to the selected first command as accompanying information.

Further, the first program 24 of the outside mediation apparatus 12 requests the management server 11 to transmit program files of the control program 44 of the updated firmware version, since the third command specifies an instruction to update the firmware version of the control program 44. Upon receiving the request, the management server 11 transmits the program files to the outside mediation apparatus 12. The first program 24 receives the transmitted program files and stores the same in the memory 22. Then, the first program 24 generates a first command that instructs the second program 34 of the inside mediation apparatus 13 to download the program files stored in the memory 22.

Note that, while the present embodiment describes an example that program files are used to update the firmware version of the control program 44, a text file including text that commands the target printer 14 to modify settings may be used, for example. In this case, the first program 24 may request the management server 11 to transmit a text file, receive the text file transmitted from the management server 11, store the received text file in the memory 22, and generate a first command instructing the second program 34 of the inside mediation apparatus 13 to download the text file stored in the memory 22.

Each of the "transmission order A", "transmission order B", and "transmission order C" is information indicating the order in which the plurality of generated first commands should be transmitted to the second program 34 of the inside mediation apparatus 13. The "transmission order A" is an order whose priority is higher than the "transmission order B". Hence, the "transmission order B" is an order of lower priority than the "transmission order A". In addition, the "transmission order B" is an order whose priority is higher than the "transmission order C", and hence, the "transmission order C" is an order of lower priority than the "transmission order B". In other words, the transmission order for a first command instructing the printer 14 to update the firmware version of the control program 44 (S74) is set to a higher priority than the transmission order for a first command instructing the printer 14 to modify settings information (S76, S77).

More specifically, when the firmware version of the control program 44 is modified, the control program 44 or the firmware version of the control program 44 may not be able to retain the values for settings information set prior to the firmware version update. In other words, the control program 44 might reset the values of settings information to initial values when its firmware version has been updated. In this case, if the firmware version is updated after settings information of the printer 14 is modified, the modified settings information will simply be reset to the initial values, resulting in setting values for the printer 14 that are different from those intended by the administrator. By setting the priority for the transmission order for a first command instructing the update of the firmware version of the control program 44 to a higher than the priority for the transmission order for a first command instructing the modification of settings information, modified values of settings information for the printer 14 can be prevented from being reset irrespective of intension of the administrator.

Also, there may be some settings information that the control program 44 can set after its firmware version has been updated but cannot set prior to the firmware version being updated. When modification of this type of settings information is instructed, the settings information will not be modified on the printer 14 in accordance with the intention of the administrator unless the modification is instructed after the firmware version of the control program 44 is updated. By setting the transmission order for a first command instructing the update of the firmware version of the control program 44 to a higher priority than the transmission order for a first command instructing the modification of settings information, the settings information for the printer 14 can be modified according to the wishes of the administrator.

Further, the control program 44 might interpret the value of the same settings information differently prior to its firmware version being updated and after its firmware version has been updated. For example, a setting value of "3" for density may be interpreted as the third of three levels by the control program 44 prior to its firmware version being updated, while the same setting value might be interpreted as the third of five levels by the control program 44 after the firmware version has been updated.

Consequently, if the settings information were modified prior to updating the firmware version of the control program 44, the settings information on the printer 14 may be changed to a value not intended by the administrator. However, by setting the transmission order for a first command instructing the update of the firmware version of the control program 44 to a higher priority than the transmission order for a first command instructing the modification of settings information, settings information for the printer 14 can be modified according to the wishes of the administrator.

When the first program 24 of the outside mediation apparatus 12 determines in S72 that the current firmware version of the control program 44 matches the firmware version specified in the third command (S72: YES), in S73 the first program 24 determines that a first command will not be generated. In other words, there is no need to update the firmware version of the control program 44 when the current firmware version matches the firmware version specified in the third command Therefore, the first program 24 determines not to generate a first command instructing an update of the firmware version of the control program 44.

When the first program 24 of the outside mediation apparatus 12 determines in S71 that the third command specifies an instruction to modify settings information of the printer 14 (S71: Modify Settings Information), in S75 the first program 24 determines the type of this modification. More specifically, in S75 the first program 24 determines whether modification of the settings information does not require that the control program 44 of the printer 14 be restarted (hereinafter called a "first modification"), or whether the modification of the settings information requires that the control program 44 be restarted (hereinafter called a "second modification).

More specifically, modifications of settings information are broadly classified as modifications accompanied by a restart of the control program 44 and modifications not accompanied by a restart of the control program 44. The control program 44 of the printer 14 executes a restart when determining that a prescribed item among the settings information (see FIG. 2) has been modified. For example, the memory 42 of the printer 14 may store a table correlating certain items of settings information with the execution of a restart. The control program 44 of the printer 14 uses the table stored in the memory 42 to determine whether the settings information is correlated to the execution of a restart, and executes the restart when determining that settings information correlated to the execution of a restart has been modified.

This table may also be stored in the memory 22 of the outside mediation apparatus 12. For example, a flag may be recorded in the correlation database DB in association with each item of settings information illustrated in FIG. 2 to indicate whether the settings information requires a restart of the control program 44. The first program 24 of the outside mediation apparatus 12 uses the correlation database DB to determine whether the modification of settings information specified in the third command is a first modification not requiring the control program 44 be restarted, or a second modification requiring that the control program 44 be restarted.

When the first program 24 determines that the instruction specified by the third command is a first modification not requiring a restart of the control program 44 (S75: First Modification), in S76 the first program 24 generates a first command instructing the modification of settings information and sets the priority for the transmission order for the first command to the "transmission order B". As described above, the first command instructing the modification of settings information is generated using a first command list stored in the memory 22 and specifying correlations between third commands and first commands.

On the other hand, when the first program 24 determines that the instruction specified by the third command is a second modification requiring that the control program 44 be restarted (S75: Second Modification), in S77 the first program 24 generates a first command instructing the modification of settings information and sets the priority for the transmission order for the first command to the "transmission order C".

Here, the transmission order for a first command instructing the modification of settings information that requires a restart of the control program 44 on the printer 14 is given a lower priority than the transmission order for a first command specifying a modification of settings information that does not require a restart in order to reduce the time required for modifying settings. That is, by instructing all modifications of settings information that require a restart to be performed altogether on the printer 14, the first program 24 can reduce the number of times the control program 44 is restarted when settings are modified, thereby reducing the time required for modifying settings.

In S78, the first program 24 of the outside mediation apparatus 12 determines whether first commands have been generated for all of the received third commands, and the transmission order has been set for each of the generated first commands. When the first program 24 determines that first commands have not yet been generated for all of the received third command, i.e., there are any remaining third command for which a first command has not yet been generated (S78: NO), the first program 24 returns to the process of S71 and executes the process of S71 to S77 for the remaining third command. On the other hand, when the first program 24 determines that the first commands have been generated for all of the received third commands (S78: YES), the first program 24 proceeds to the process in S79.

In S79 the first program 24 of the outside mediation apparatus 12 sets the transmission order for the plurality of generated first commands based on the transmission order set above. Specifically, the first program 24 sets the order for transmitting the first commands to the order of first commands whose priority for the transmission order indicates the "transmission order A", first commands whose priority for the transmission order indicates the "transmission order B", and first commands whose priority for the transmission order indicates the "transmission order C".

After setting the transmission order for the generated first commands in S79, the first program 24 of the outside mediation apparatus 12 waits until an HTTP request has been received from the inside mediation apparatus 13.

Figure 5:
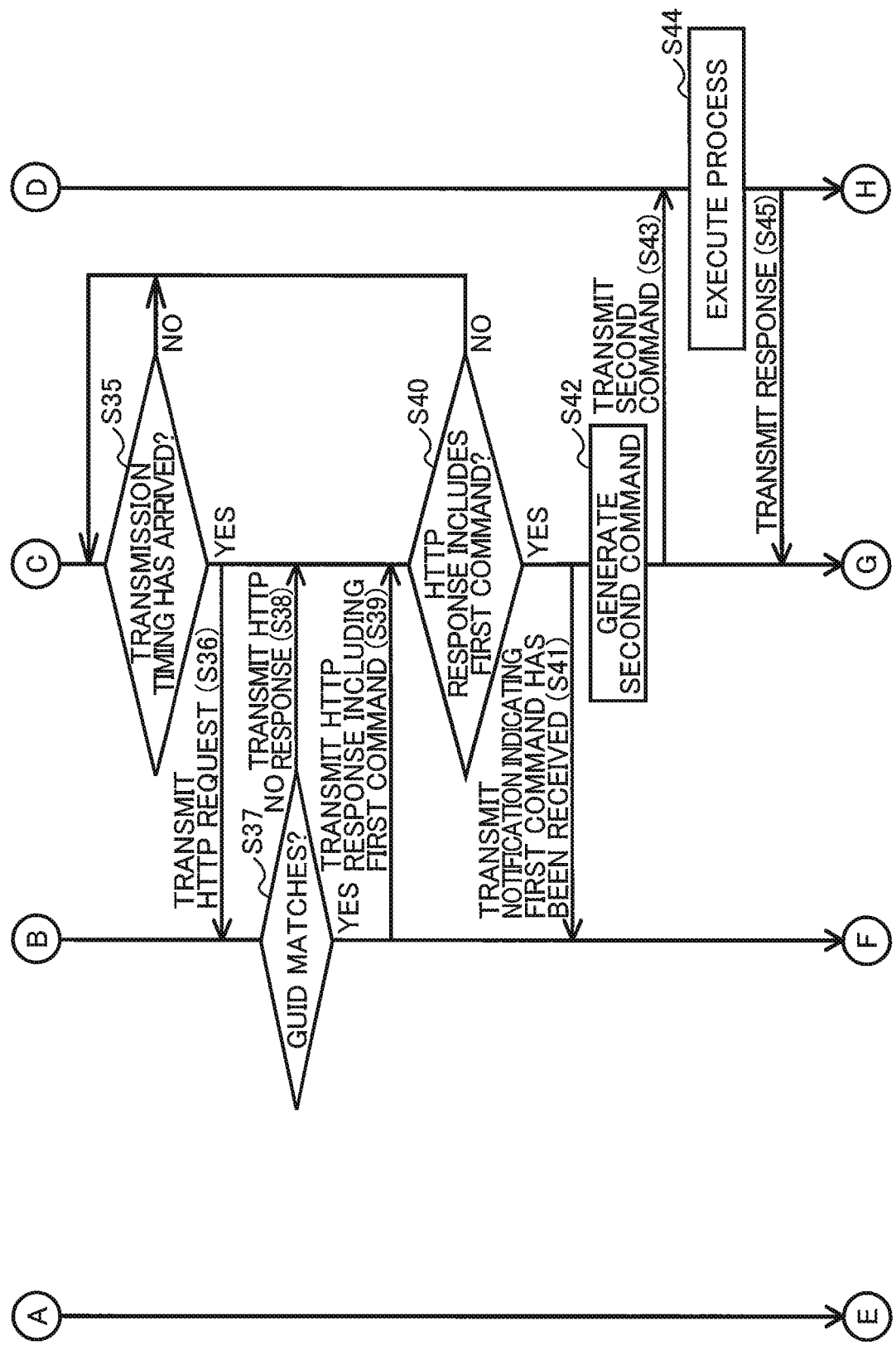
FIG. 5 is a sequence diagram illustrating a second part of the process executed by the management server, the outside mediation apparatus, the inside mediation apparatus, and the printer in the management system according to the embodiment.

In the meantime, the second program 34 of the inside mediation apparatus 13 determines in S35 of FIG. 5 whether a transmission timing prestored in the memory 32 has arrived and repeatedly performs this determination until the transmission timing has arrived (S35: NO). The transmission timing is set to an interval of a few seconds to a few tens of seconds, such as a 10-second, 15-second, or 20-second interval.

When the second program 34 of the inside mediation apparatus 13 determines that the transmission timing has arrived (S35: YES), in S36 the second program 34 transmits an HTTP request including its own GUID to the outside mediation apparatus 12. Here, the outside mediation apparatus 12 can transmit the first commands to the inside mediation apparatus 13 via the firewall by including the first commands in an HTTP response as a response to an HTTP request received from the inside mediation apparatus 13. Note that the firewall blocks transmissions from the outside mediation apparatus 12 to the inside mediation apparatus 13 other than HTTP responses as responses to HTTP requests transmitted from the inside mediation apparatus 13. For this reason, the inside mediation apparatus 13 periodically transmits an HTTP request to the outside mediation apparatus 12. Note that the device IDs collected from the printers 14 and the GUID of the inside mediation apparatus 13 itself, that are transmitted to the outside mediation apparatus 12 in S14, may be included in an HTTP request periodically transmitted in S36.

In S36 the first program 24 of the outside mediation apparatus 12 receives the HTTP request from the inside mediation apparatus 13. In S37 the first program 24 determines whether the GUID included in the HTTP request matches the GUID identified in S33. In other words, the first program 24 determines whether the inside mediation apparatus 13 that transmitted the HTTP request to the outside mediation apparatus 12 is the inside mediation apparatus 13 to which the first command generated in S34 is to be transmitted.

When the first program 24 determines that the GUID included in the HTTP request received in S36 does not match the GUID identified in S33 (S37: NO), in S38 the first program 24 transmits an HTTP response that does not include the first command. The HTTP response transmitted in S38 indicates that the HTTP request transmitted in S36 has been received.

On the other hand, when the first program 24 determines that the GUID included in the HTTP request received in S36 matches the GUID identified in S33 (S37: YES), in S39 the first program 24 transmits an HTTP response that includes the first commands whose priority for the transmission order indicates "transmission order A".

In S38 or S39 the second program 34 of the inside mediation apparatus 13 receives an HTTP response transmitted from the outside mediation apparatus 12. In S40 the second program 34 determines whether the HTTP response includes a first command. When the second program 34 determines that the HTTP response does not include first commands (S40: NO), the second program 34 continues to transmit periodic HTTP requests.

On the other hand, when the second program 34 determines that the HTTP response includes first commands (S40: YES), in S41 the second program 34 transmits an HTTP request to the outside mediation apparatus 12 that includes a notification indicating that the first command has been received (hereinafter called a "reception notification"). In other words, the second program 34 notifies the outside mediation apparatus 12 that the first commands have been received.

As described above, the first program 24 of the outside mediation apparatus 12 returns the first commands as an HTTP response to an HTTP request received from the inside mediation apparatus 13. Therefore, in a case where the outside mediation apparatus 12 does not receive a reception notification from the inside mediation apparatus 13, the first program 24 of the outside mediation apparatus 12 cannot determine whether the inside mediation apparatus 13 was able to receive the first commands until the first program 24 receives a response corresponding to the first commands in S64 (described later). In such a case, the time required for the outside mediation apparatus 12 to receive a response corresponding to the first commands would exceed the prescribed time set as the time interval to wait until re-sending the first commands. This may cause the outside mediation apparatus 12 to re-send the first commands despite the fact that the inside mediation apparatus 13 has already received the first commands.

In the present embodiment, the second program 34 of the inside mediation apparatus 13 transmits the reception notification to the outside mediation apparatus 12 prior to transmitting the response corresponding to the first commands (S64). This action prevents the outside mediation apparatus 12 from re-sending the first commands despite the inside mediation apparatus 13 has already received the first commands from the outside mediation apparatus 12.

In S41, the first program 24 of the outside mediation apparatus 12 receives the HTTP request that includes the reception notification. Although not illustrated in the sequence diagram of FIG. 5, when the first program 24 determines that an HTTP request including a reception notification has not been received within the prescribed period of time, the first program 24 re-sends the first commands transmitted in S39 to the inside mediation apparatus 13 as an HTTP response to an HTTP request transmitted periodically from the inside mediation apparatus 13. In addition, upon receiving an HTTP request including the reception notification, the first program 24 returns an HTTP response to the inside mediation apparatus 13 indicating that the reception notification has been received.

After completing the process of S41, in S42 the second program 34 of the inside mediation apparatus 13 generates a second command to be transmitted to the printer 14. The second command is a command that can be inputted into the printer 14 and corresponds to the content of the instruction specified by each of the received first commands.

Although not illustrated in FIG. 1, the data storage area 39 in the memory 32 of the inside mediation apparatus 13 stores a second command list specifying correlations between first commands and second commands. In S42 the second program 34 of the inside mediation apparatus 13 generates the second commands by referencing the second command list and identifying the second command associated with the first commands received in S39.

Although not illustrated in the sequence diagram of FIG. 5, the second program 34 of the inside mediation apparatus 13 transmits an HTTP request that includes a file transmission request to the outside mediation apparatus 12 since the first commands received in S39 instruct the inside mediation apparatus 13 to download program files. The file transmission request requests the outside mediation apparatus 12 to transmit program files for the control program 44. Upon receiving this HTTP request, the first program 24 of the outside mediation apparatus 12 transmits an HTTP response including the program files to the inside mediation apparatus 13 in response to the file transmission request included in the HTTP request. The second program 34 of the inside mediation apparatus 13 receives the program files included in this HTTP response. The second program 34 generates a second command that includes the received programs files.

Note that the program files may be included in first command transmitted in S39. In this case, the second program 34 need not transmit a file transmission request to the first program 24.

Note that the second program 34 of the inside mediation apparatus 13 may determine based on a status request flag accompanying the first command whether the instruction specified by the first command received in S39 is an instruction to modify settings information, update the firmware version of the control program 44, or to acquire settings information. For example, if the third command received in S31 is an instruction to request settings information, the first program 24 of the outside mediation apparatus 12 attaches a status request flag set to "ON" to the first command.

After generating the second commands, in S43 the second program 34 of the inside mediation apparatus 13 transmits the generated second commands to the printer 14 having the device ID included in the first commands.

In S43 the printer 14 receives the second command from the inside mediation apparatus 13. In S44 the control program 44 of the printer 14 executes the processes instructed by the received second command. If the second command is generated based on the first command whose priority for the transmission order is set to the "transmission A", i.e., if the second command is an instruction to update the firmware version of the control program 44, the control program 44 updates itself using the program files included in the second command. If the second command is an instruction requesting that status information be returned, in S45 the control program 44 returns the status information of the printer 14. Since the first command transmitted to the inside mediation apparatus 13 in S39 is the first command having the "transmission order A", the control program 44 of the printer 14 updates itself using the control program 44 included in the second command.

In the meantime, if the second command is generated based on the first command whose priority for the transmission order indicates the "transmission order B" or the "transmission order C", i.e., the second command specifies an instruction to modify a setting in the printer 14 for one of the items in the settings information including "Font", "Font Size", and "Density" (see FIG. 2), the control program 44 modifies the setting for the respective "Font," "Font Size," and "Density" to the value included in the second command.

In S45 the control program 44 of the printer 14 transmits a response to the inside mediation apparatus 13 indicating that the processes in accordance with the instruction specified in the second command has been executed.

In S45 the second program 34 of the inside mediation apparatus 13 receives the response transmitted from the printer 14. Upon receiving this response from the printer 14, in S61 of FIG. 6 the second program 34 transmits a command to the printer 14 requesting the printer 14 to return the status information. The status information of the printer 14 may include settings information, the firmware version of the printer 14, and the like. Note that the second program 34 skips the process of S61 and S62 when the second command transmitted in S43 is an instruction requesting the return of status information of the printer 14.

Upon receiving the command requesting the return of status information in S61, in S62 the control program 44 returns the status information of the printer 14. In S62 the inside mediation apparatus 13 receives the settings information from the printer 14. The status information transmitted from the printer 14 is the status information that exists after the control program 44 of the printer 14 executed the content instructed by the second command in S44. That is, the status information received in S62 indicates the firmware version of the control program 44 that has been updated in S44, or the settings information that has been recently modified in S44.

After receiving the settings information from the printer 14, in S63 the second program 34 of the inside mediation apparatus 13 waits until the transmission timing for periodically transmitting the HTTP request has arrived (S63: NO). When the second program 34 determines that the transmission timing has arrived (S63: YES), in S64 the second program 34 transmits an HTTP request to the outside mediation apparatus 12 as a response to the first command received in S39. The HTTP request includes the status information for the printer 14 after the process of S44 was executed. In this case, the HTTP request transmitted to the outside mediation apparatus 12 includes status information for the printer 14 that exists after the firmware version of the control program 44 has been updated.

By including the status information in one of the HTTP requests transmitted periodically to the outside mediation apparatus 12, the number of communications between the inside mediation apparatus 13 and the outside mediation apparatus 12 can be reduced compared to a case where the status information is transmitted in an HTTP request separate from the periodic HTTP requests.

However, the second program 34 may include the modified status information in an HTTP request separate from the periodic HTTP requests and transmit this HTTP request to the outside mediation apparatus 12. In this case, the status information can be sent more quickly to the outside mediation apparatus 12 than when the status information is included in one of the periodically transmitted HTTP requests.

In S64 the first program 24 of the outside mediation apparatus 12 receives the HTTP request including the status information for the printer 14 as a response to the first commands transmitted in S39. After receiving the settings information, in S65 the first program 24 overwrites the values for settings information, firmware version, and the like in the correlation database DB (see FIG. 2) with the newly received status information.

Figure 6:
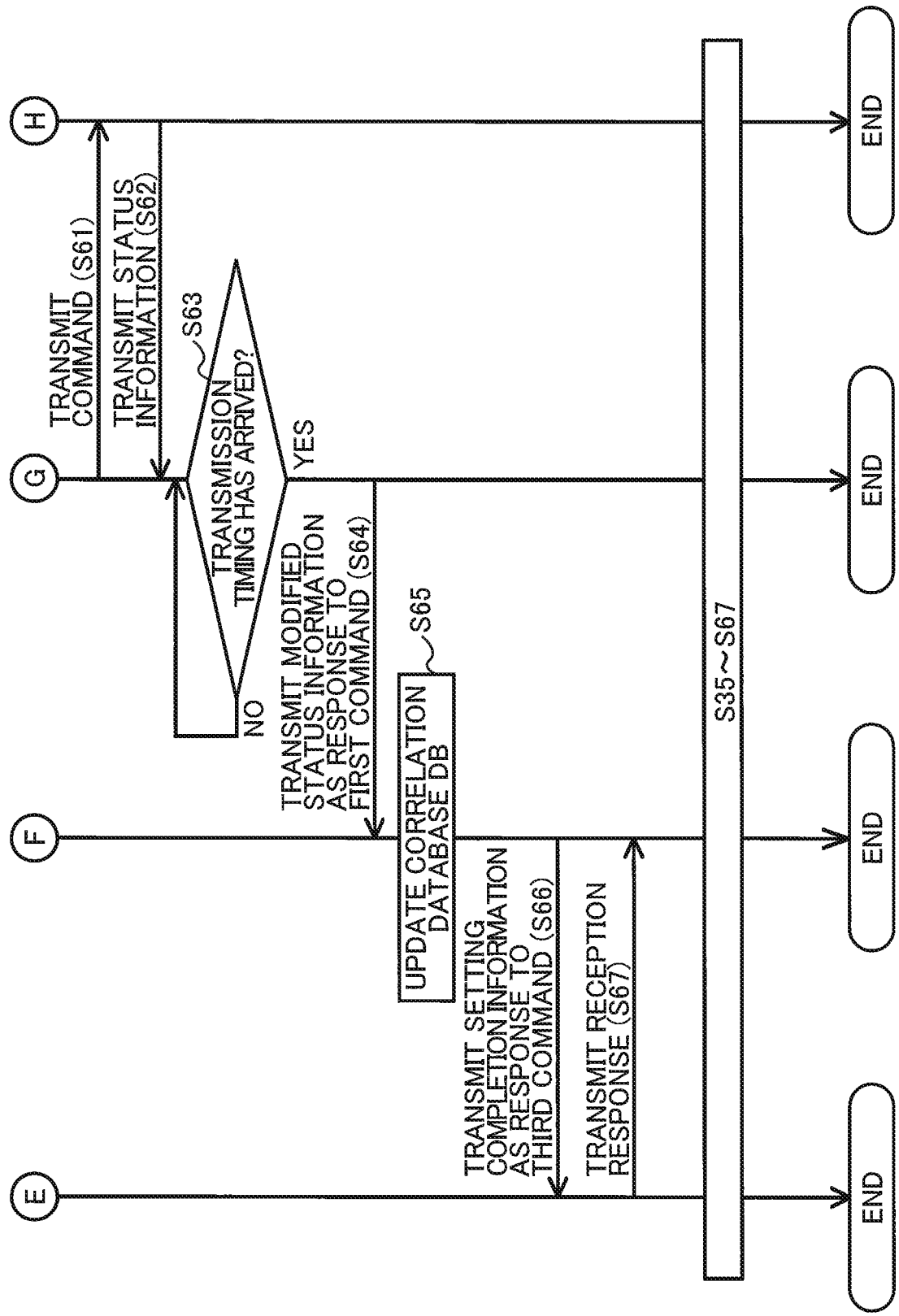
FIG. 6 is a sequence diagram illustrating a third part of the process executed by the management server, the outside mediation apparatus, the inside mediation apparatus, and the printer in the management system according to the embodiment.

While not illustrated in the sequence diagram of FIG. 6, after the first program 24 receives an HTTP request including status information in S64, the first program 24 transmits an HTTP response to this HTTP request to the inside mediation apparatus 13 indicating that the HTTP request has been received.

In S66 the first program 24 of the outside mediation apparatus 12 generates setting completion information that includes the status information received in S64 and information indicating that the printer 14 has executed the instructions specified by the first commands, and transmits this setting completion information to the management server 11 as a response to the third commands received in S31. The setting completion information is a command that can be inputted into the management server 11 and that includes the status information as accompanying information, for example.

Incidentally, the first program 24 of the outside mediation apparatus 12 may transmit the status information received in S64 to the management server 11 separately from the setting completion information. In other words, information indicating that status information has been modified, and status information obtained after the status information has been modified may be transferred separately to the management server 11.

After receiving the setting completion information via the Internet 15 in S66, in S67 the management server 11 transmits a reception response to the outside mediation apparatus 12 indicating that the setting completion information has been received. The first program 24 of the outside mediation apparatus 12 receives the reception response from the management server 11 in S67.

Note that, after completing the process in S65, the first program 24 may transmit an HTTP request to the management server 11 including a notification indicating that the status information on the printer 14 has been modified based on the third commands transmitted from the management server 11. As a response to the HTTP request, the management server 11 transmits an HTTP response to the first program 24 indicating that the notification has been received. Then, the management server 11 transmits an HTTP request to the first program 24 requesting to transmit the modified status information on the printer 14. According to the HTTP request from the management server 11, the first program 24 transmits to the management server 11 an HTTP response including the modified status information on the printer 14 received in S64.

Next, in S39 of FIG. 5, the first program 24 of the outside mediation apparatus 12 transmits first commands whose priority for the transmission order indicates the "transmission order B" to the inside mediation apparatus 13. As described above, a first command whose priority for the transmission order indicates the "transmission order B" is a command that does not require the control program 44 of the printer 14 to be restarted. Upon receiving the first commands, the second program 34 of the inside mediation apparatus 13 executes the process from S44 to S64 described above. When the first program 24 of the outside mediation apparatus 12 receives a response to the first commands in S64, the first program 24 executes the process from S65 to S67 described above.

Next, in S39 of FIG. 5 the first program 24 of the outside mediation apparatus 12 transmits first commands whose priority for the transmission order indicates the "transmission order C". When there is a plurality of first commands whose priority for the transmission order indicates the "transmission order C", in S39 the first program 24 transmits all of the first commands in a file or the like to the inside mediation apparatus 13, for example. More specifically, if the first program 24 were to transmit each of the first commands sequentially to the inside mediation apparatus 13 at intervals, a situation may arise in which the second program 34 of the inside mediation apparatus 13 generates a plurality of second commands and transmits these commands to the printer 14.

However, when the first program 24 transmits all of the first commands together, the second program 34 generates a single second command for modifying settings information and transmits this command to the printer 14. Alternatively, the second program 34 may generate a plurality of second commands in response to the plurality of first commands, generate a command instructing the execution of a single restart for the plurality of second commands, and transmit these commands to the printer 14.

Note that a method different from the method of transmitting a plurality of first commands at once may be employed, provided that the method can make the second program 34 recognize that there is a plurality of first commands requiring a restart of the control program 44. For example, the first program 24 of the outside mediation apparatus 12 may transmit an HTTP response including information specifying the number of first commands specifies modification of the settings information that requires a restart of the control program 44 to be transmitted to the inside mediation apparatus 13 in response to a periodically received HTTP request prior to transmitting the plurality of first commands.

Further, the second program 34 of the inside mediation apparatus 13 may generate a single second command instructing the modification of status information corresponding to modifications specified by a plurality of first commands, not only when the first commands require a restart, but also when there is a plurality of first commands that do not need a restart, and may transmit this command to the printer 14.

When the first program 24 of the outside mediation apparatus 12 receives a plurality of third commands directing the modification of settings information not requiring a restart of the control program 44, the first program 24 may generate a single first command instructing the modification of settings information corresponding to the modifications of settings information specified by the plurality of third commands and may transmit this single first command to the inside mediation apparatus 13.

In addition, when the first program 24 receives a plurality of third commands instructing the modification of settings information requiring a restart of the control program 44, the first program 24 may generate a single first command directing the modification of settings information according to the modifications of settings information specified in the plurality of third commands and may transmit this second command to the inside mediation apparatus 13.

Upon receiving the first command, the second program 34 of the inside mediation apparatus 13 executes the processes from S44 to S64 described above. When the outside mediation apparatus 12 receives a response to the first command in S64, the first program 24 of the outside mediation apparatus 12 executes the processes from S65 to S67 described above.

As described above, the second program 34 of the inside mediation apparatus 13 transmits a plurality of second commands to the printer 14 in a transmission order corresponding to the transmission order of the plurality of first commands inputted from the outside mediation apparatus 12. The transmission order for the first commands is determined through the transmission order setting process executed by the first program 24. Hence, the transmission order by which second commands are transmitted to the printer 14 is also set according to the transmission order setting process executed by the first program 24.

Further, as described above, after the first program 24 of the outside mediation apparatus 12 receives a response to a first command having a transmission order of the highest priority, the first program 24 transmits first commands having a transmission order of the next highest priority to the inside mediation apparatus 13. Transmitting a first command having next highest priority to the inside mediation apparatus 13 after receiving a response to a first command having the highest priority is an example of the manner that indicates the transmission order.

<Operational Advantages of the Embodiment>

In the present embodiment, a command from the management server 11 is inputted into the printer 14 by the first program 24 of the outside mediation apparatus 12 and the second program 34 of the inside mediation apparatus 13. Accordingly, the management server 11 is capable of managing printers 14 that do not have a function for connecting to the Internet 15. That is, printers 14 that do not have a function to connect to the Internet 15 can be managed using an MDM system.

In the present embodiment, the first program 24 of the outside mediation apparatus 12 can set the transmission order for a plurality of second commands to be transmitted to the printer 14 from the inside mediation apparatus 13 by executing the transmission order setting process. Therefore, the second commands can be inputted into the printer 14 in an appropriate order.

In the present embodiment, the first program 24 of the outside mediation apparatus 12 transmits first commands having a transmission order of the next highest priority after receiving a response to first commands having a transmission order of the highest priority. Therefore, the second program 34 of the inside mediation apparatus 13 can transmit second commands to the printer 14 according to a suitable transmission order, without determining the transmission order for first commands received from the outside mediation apparatus 12.

In the present embodiment, the priority for the transmission order for a first command instructing the update of the firmware version of the control program 44 of the printer 14 is set to the "transmission order A", which is higher than other first commands having the "transmission order B" or the "transmission order C". Accordingly, status information for the printer 14 can be modified according to the intention of the administrator.

In the present embodiment, the priority for the transmission order for a first command that does not require a restart of the control program 44 on the printer 14 is set to the "transmission order B", while the priority for the transmission order for a first command that requires a restart of the control program 44 is set to the "transmission order C". The first commands having the priority for the transmission order the "transmission order C" are transmitted to the inside mediation apparatus 13 such that only single restart of the control program 44 is required for the plurality of first commands having the "transmission order C". This configuration can suppress repeated restarts of the control program 44 if a plurality of third commands indicating that a restart of the control program 44 is required is inputted into the outside mediation apparatus 12, thereby reducing the time required to modify settings information for the printer 14.

<Modifications and Variations of the Embodiment>

While the description has been made in detail with reference to the embodiment(s) thereof, it would be apparent to those skilled in the art that many modifications and variations may be made therein without departing from the spirit of the disclosure.

<First Variation>

The above embodiment describes an example in which the outside mediation apparatus 12 transmits a first command having a transmission order of the next highest priority to the inside mediation apparatus 13 after receiving a response to a first command having a transmission order of the highest priority in the transmission order. In this variation, the outside mediation apparatus 12 attaches transmission order information indicating a transmission order to each of the first commands before transmitting the first commands to the inside mediation apparatus 13.

The first program 24 of the outside mediation apparatus 12 generates a plurality of first commands while attaching transmission order information specifying their transmission order set in S74, S76, and S77 of the transmission order setting process of FIG. 7 to each of the first commands. The transmission order information may be a numeral such as "1", "2", "3", . . . , or a letter such as "A", "B", "C", . . . . Attaching the transmission order information to each of the first commands is an example of the manner that indicates the transmission order.

In S39 of FIG. 5, the first program 24 of the outside mediation apparatus 12 transmits to the inside mediation apparatus 13 an HTTP response that includes all of the first commands generated to that point and including transmission order information indicative of their transmission order. Alternatively, the first program 24 may transmit the plurality of generated first commands to the inside mediation apparatus 13 in sequence each time an HTTP request is received from the inside mediation apparatus 13, without confirming that a response to the first command that has already been sent has been received from the inside mediation apparatus 13.

In S43 of FIG. 5, the second program 34 of the inside mediation apparatus 13 transmits the second commands to the printer 14 according to the transmission order indicated by the transmission order information attached to each of the first commands on which the second command were based.

<Operational Advantages of the First Variation>

In the first variation, the second program 34 of the inside mediation apparatus 13 transmits second commands to the printer 14 according to the transmission order information attached to the first commands. Accordingly, the second commands are transmitted to the printer 14 in a suitable order.

<Second Variation>

Rather than attaching transmission order information to first commands, a plurality of first commands may be compiled in a file or the like and transmitted as a file to the inside mediation apparatus 13. The file is an example of the package data.

For example, the second program 34 of the inside mediation apparatus 13 adopts the order of the first commands in the file as the transmission order for the first commands. In S43 the second program 34 transmits the generated second commands to the printer 14 according to this transmission order. Compiling a plurality of first commands in a file is an example of the manner that indicates the transmission order.

Alternatively, the transmission order information described in the first variation may be included in the file. In this case, in S43 the second program 34 of the inside mediation apparatus 13 transmits the generated second commands to the printer 14 according to the transmission order specified by the transmission order information included in the file. Including the transmission order in the file is an example of the manner that indicates the transmission order.

<Operational Advantages of the Second Variation>

In the second variation, the second program 34 of the inside mediation apparatus 13 transmits second commands to the printer 14 according to the order of the first commands in the file or according to the transmission order specified by transmission order information included in the file. Accordingly, the second commands are transmitted to the printer 14 in an appropriate order.

<Third Variation>

In the embodiment described above, the transmission order setting process is executed on a plurality of third commands inputted into the outside mediation apparatus 12 in between HTTP requests periodically transmitted from the inside mediation apparatus 13 (S36) or is executed at prescribed time intervals. In this variation, the transmission order setting process is executed each time a third command is inputted into the outside mediation apparatus 12.

Upon receiving a third command from the management server 11 in S31 of FIG. 4, the first program 24 of the outside mediation apparatus 12 determines whether there remain any first commands that have not yet been sent to the inside mediation apparatus 13. When the first program 24 determines that there are unsent first commands, the first program 24 executes the transmission order setting process for the newly received third command, and sets a new transmission order for all of the unsent first commands and the newly generated first command. In S39 the first program 24 transmits the first commands to the inside mediation apparatus 13 according to the newly set transmission order.

<Operational Advantages of the Third Variation>

In the third variation, if a newly received third command indicates an instruction for updating the firmware version of the control program 44 on the printer 14, for example, the newly generated first command is transmitted to the inside mediation apparatus 13 before an unsent first command for modifying settings information based on the newly set transmission order. Accordingly, a second command generated based on the newly received third command can also be transmitted to the printer 14 in a suitable order.

<Fourth Variation>

Figure 8:
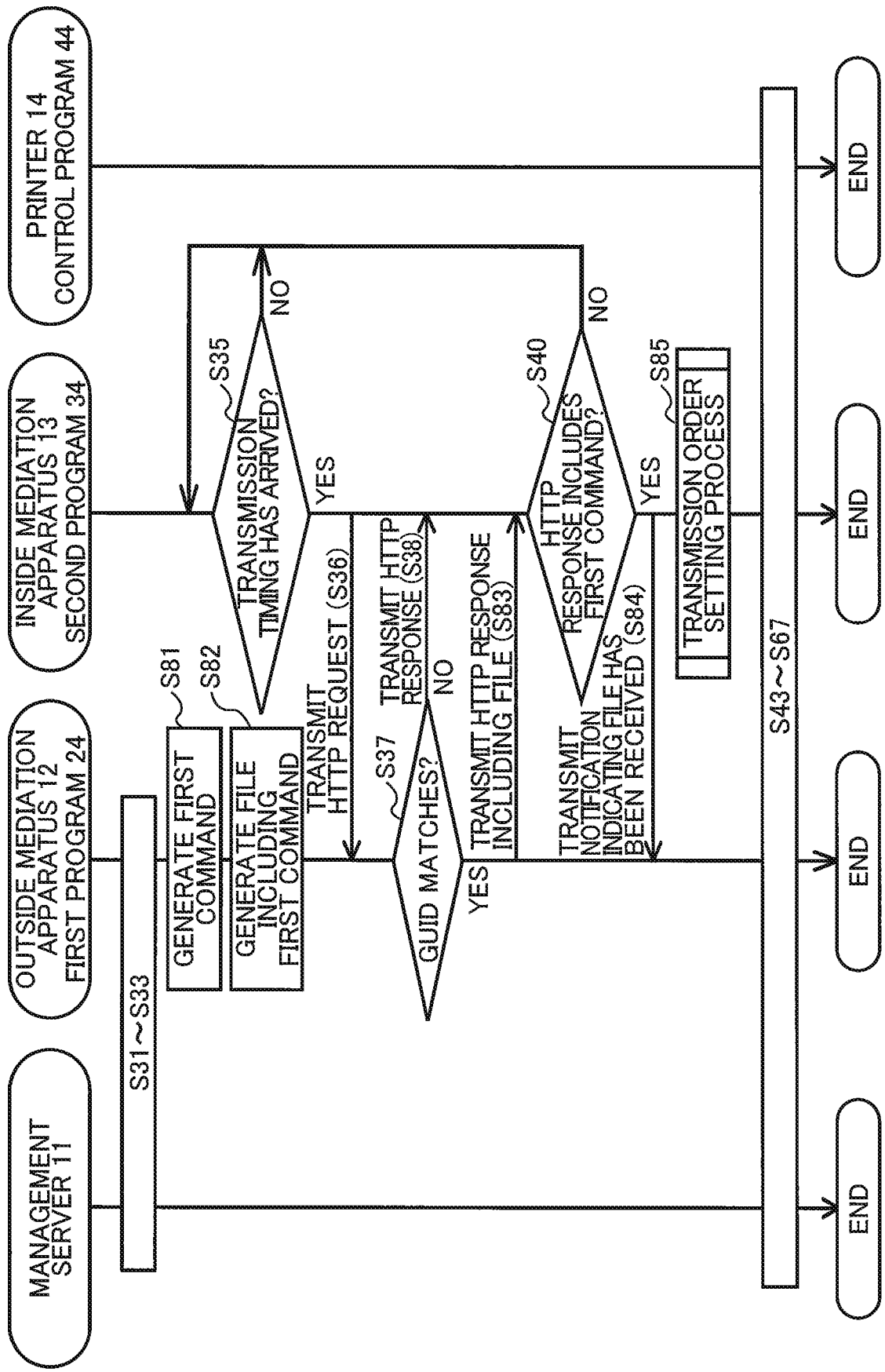
FIG. 8 is a sequence diagram illustrating a process executed by a management server, an outside mediation apparatus, an inside mediation apparatus, and a printer in a management system according to a fourth modification.

The above embodiment describes a case in which the first program 24 of the outside mediation apparatus 12 executes a transmission order setting process to set the transmission order. In the fourth variation, the second program 34 of the inside mediation apparatus 13 executes the transmission order setting process to set the order that each second command is transmitted to the printer 14. This fourth variation will be described with reference to FIG. 8, wherein steps identical to those described in the embodiment are designated with the same step numbers to avoid duplicating description.

In the embodiment described above, the first program 24 of the outside mediation apparatus 12 executes steps S31 to S33 to receive a plurality of third commands from the management server 11. In S81 the first program 24 generates a plurality of first commands corresponding to the received third commands without executing the transmission order setting process. Specifically, the first program 24 generates each first command by extracting the first command from the first command list described in the embodiment that is associated with the third command received from the management server 11.

In S82 the first program 24 of the outside mediation apparatus 12 creates a file that includes all of the first commands. In S36 the first program 24 receives an HTTP request that is periodically transmitted by the inside mediation apparatus 13 (S35), and in S83 transmits an HTTP response to this HTTP request that includes the file created in S82.

Upon receiving an HTTP response (S38 or S83), in S40 the second program 34 of the inside mediation apparatus 13 determines whether the HTTP response includes a file. When the second program 34 determines that a file is included in the HTTP response (S40: YES), in S84 the second program 34 transmits an HTTP request to the outside mediation apparatus 12 that includes a reception notification indicating that the file has been received. Although not illustrated in the sequence diagram in FIG. 8, after receiving the HTTP request that includes a reception notification in S84, the first program 24 of the outside mediation apparatus 12 transmits an HTTP response to the inside mediation apparatus 13 indicating that the reception notification has been received.

When receiving an HTTP response that includes a file, in S85 the second program 34 of the inside mediation apparatus 13 executes the transmission order setting process for the first commands included in the file. In the transmission order setting process for the fourth variation, the second program 34 generates the second command according to the characteristics of the instruction specified by the first command, and sets the priority for the transmission order for the second command to one of the "transmission order A", the "transmission order B", and the "transmission order C". The transmission order setting process executed by the second program 34 will be described with reference to FIG. 7.

In S71 of FIG. 7, the second program 34 of the inside mediation apparatus 13 determines whether the first command specifies an instruction to update the firmware version of the control program 44 or to modify settings information. When the second program 34 determines that the first command specifies an instruction to update the firmware version of the control program 44 (S71: Update Firmware Version), in S72 the second program 34 determines whether the current firmware version of the control program 44 matches the firmware version specified in the first command.

When the second program 34 determines that the current firmware version of the control program 44 does not match the firmware version specified in the first command (S72: NO), in S74 the second program 34 generates a second command and sets the priority for the transmission order for the second command to the "transmission order A".

On the other hand, when the second program 34 determines that the current firmware version of the control program 44 matches the firmware version specified in the first command (S72: YES), in S73 the second program 34 determines not to generate a second command.

When the second program 34 of the inside mediation apparatus 13 determines in S71 that the first command specifies an instruction to modify settings information (S71: Modify Settings Information), in S75 the second program 34 determines whether the modification of settings information requires a restart of the control program 44 on the printer 14 or does not require a restart.

When the second program 34 determines that the instruction specified by the first command is a first modification not requiring a restart of the control program 44 (S75: First Modification), in S76 the second program 34 generates a second command instructing the modification of the settings information and sets the priority for the transmission order for the second command to the "transmission order B".

On the other hand, when the second program 34 determines that the instruction specified by the first command is a second modification requiring that the control program 44 be restarted (S75: Second Modification), in S77 the second program 34 generates a second command instructing the modification of the settings information and sets the priority for the transmission order for the second command to the "transmission order C".

Then in S78 the second program 34 determines whether the second commands have been generated for all of the received first commands, i.e., there remains any first command for which a second command has not been generated. When determining that second commands have not yet been generated for all of the received first command, i.e., there are any remaining first command for which a second command has not yet been generated (S78: NO), the second program 34 returns to the process of S71 and executes the process of S71 to S77 for the remaining first command.

When the second program 34 determines that the second commands have been generated for all of the received first commands (S78: YES), in S79 the second program 34 of the inside mediation apparatus 13 sets the transmission order for the plurality of second commands based on the priority order for the transmission order set above. Specifically, the second program 34 sets the transmission order for second commands to the order of second commands whose priority for the transmission order indicates the "transmission order A", second commands whose priority for the transmission order indicates the "transmission order B", and second commands whose priority for the transmission order indicates the "transmission order C".

Referring back to FIG. 8, after completing the transmission order setting process of S85, in S43 the second program 34 transmits the second commands to the printer 14 in accordance with the transmission order set in S85, and in S45 receives a response from the printer 14. Thereafter, the first program 24 of the outside mediation apparatus 12 and the second program 34 of the inside mediation apparatus 13 execute the process from S61 to S67 in FIG. 6, as described in the embodiment.

<Operational Advantages of the Fourth Variation>

In the fourth variation, by executing the transmission order setting process, the second program 34 of the inside mediation apparatus 13 can set a transmission order for a plurality of second commands to be transmitted to the printer 14. Accordingly, the second program 34 can input a plurality of second commands into the printer 14 in a suitable order.

<Other Variations>

The above embodiment describes a case in which the administrator inputs instructions into the outside mediation apparatus 12 via the management server 11. However, the administrator may input instructions directly into the outside mediation apparatus 12. In other words, the management server 11 may not be used in an MDM system. In this case, the outside mediation apparatus 12 serves as the management server for managing the printers 14.

The administrator inputs a device ID and instruction information specifying an instruction for the printer 14 designated by the device ID into the outside mediation apparatus 12 through the user interface 26 of the outside mediation apparatus 12. The first program 24 of the outside mediation apparatus 12 receives the device ID and the instruction information inputted by the administrator. The device ID is an example of the device information. By directly inputting instruction information into the outside mediation apparatus 12 in this way, the administrator can update the firmware version of the control program 44 of the printer 14 and modify settings information for the printer 14.

The above embodiment describes an example in which the first commands are transmitted from the outside mediation apparatus 12 to the inside mediation apparatus 13 via the firewall by the inside mediation apparatus 13 transmitting an HTTP request and the outside mediation apparatus 12 returning an HTTP response. However, another communication protocol may be used provided that the first commands can be transmitted from the outside mediation apparatus 12 to the inside mediation apparatus 13 via the firewall.

For example, the outside mediation apparatus 12 and the inside mediation apparatus 13 may communicate with each other using a communication protocol conforming to XMPP Over BOSH. In this case, a session is established by the inside mediation apparatus 13 transmitting a session creation request according to XMPP Over BOSH to the outside mediation apparatus 12 and the outside mediation apparatus 12 returning a session creation response. During the established session, the outside mediation apparatus 12 can then transmit the second command to the inside mediation apparatus 13 via the firewall.

In the embodiment described above, the first program 24 is stored in the memory 22 of the outside mediation apparatus 12, and the second program 34 is stored in the memory 32 of the inside mediation apparatus 13. That is, the program for the outside mediation apparatus 12 and the inside mediation apparatus 13 are stored in the different storage media. However, these programs are stored in the same storage medium. For example, the first program 24 and the second program 34 may be stored in the same CD-ROM, and the outside mediation apparatus 12 and the inside mediation apparatus 13 may read the first program 24 and the second program 34 stored in the CD-ROM, respectively.

In the embodiment described above, the printers 14 are used as an example of devices targeted for management. However, the devices to be managed with the management system 10 may be scanners such as QR code (registered trademark) readers, bar code readers, or handheld scanners; portable sewing machines; and the like.

What is claimed is:

1. A communication system comprising an information processing apparatus, a mediation apparatus, and a device, the information processing apparatus comprising a first controller and a memory, the mediation apparatus comprising a second controller, the information processing apparatus and the mediation apparatus being capable of communicating with each other via a firewall, the mediation apparatus and the device being capable of communicating with each other via a local network, the first controller being configured to perform:
(a) storing a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device;
(b) acquiring a plurality of instruction information, each of the plurality of instruction information including a device instruction and a device information, the device instruction being instruction for the device, the device information being indicative of the device;
(c) identifying, for each of the plurality of instruction information, a device ID of the device and a mediation apparatus ID correlated to the identified device ID, the device ID being identified based on the device information, the mediation apparatus ID being identified using the correlation database;
(d) generating a first command, a plurality of first commands being generated based on the plurality of instruction information, each of the plurality of first commands including the device instruction included in the corresponding each of the plurality of instruction information and the device ID of the device identified for the corresponding each of the plurality of instruction information;
in response to a setup being performed by the mediation apparatus having the identified mediation apparatus ID, (e) transmitting, to the mediation apparatus having the identified mediation apparatus ID via the firewall, the plurality of first commands each generated in the (d) generating; and
(f) receiving, via the firewall, a response to the plurality of first commands transmitted in the (e) transmitting;
the second controller being configured to perform:
(g) starting the setup to allow information transmitted from the first controller to be received by the second controller via the firewall;
(h) receiving, via the firewall, the plurality of first commands transmitted in the (e) transmitting;
(i) generating a second command, a plurality of second commands being generated based on the plurality of first commands, each of the plurality of second commands including the device instruction included in the corresponding each of the plurality of first commands;
(j) transmitting, via the local network, the generated plurality of second commands to the device having the device ID included in the received the plurality of first commands; and
(k) transmitting, via the firewall, the response to the received plurality of first commands to the information processing apparatus,
wherein one of the first controller and the second controller is configured to further perform:
(l) setting a transmission order for the plurality of second commands generated in the (i) generating, the plurality of second commands being transmitted to the device in the (j) transmitting in the set transmission order, the transmission order being set by setting a priority for the transmission order for each of the plurality of second commands,
wherein, in a case where the (l) setting is performed by the first controller, the first controller sets the transmission order based on characteristics of the device instruction included in the plurality of first commands corresponding to the plurality of second commands,
wherein, in a case where the (l) setting is performed by the second controller, the second controller sets the transmission order based on characteristics of the device instruction included in the plurality of second commands, and
wherein the (j) transmitting comprises:
(j1) transmitting a second command of the plurality of second commands via the local network; and
(j2) transmitting another second command of the plurality of second commands via the local network, the priority for the transmission order for the second command being higher than the priority for the transmission order for the another second command, the (j1) transmitting being performed before the (j2) transmitting is performed.

2. The communication system according to claim 1, wherein the (l) setting is performed by the first controller, wherein the (e) transmitting transmits the plurality of first commands to the mediation apparatus in a manner that indicates the transmission order set in the (l) setting, and
wherein the (j1) transmitting and the (j2) transmitting are performed in accordance with the transmission order indicated by the manner represented by the plurality of first commands.

3. The communication system according to claim 1, wherein the (d) generating generates a first command specifying that a firmware version of a device program installed on the device be updated in response to one of the plurality of instruction information acquired in the (b) acquiring including version update information, the version update information being information indicating that the firmware version of the device program be updated,
wherein the (d) generating generates a first command specifying that modification to settings information on the device be performed in response to one of the plurality of instruction information acquired in the (b) acquiring including settings modification information, the settings modification information being information indicating that the modification to the settings information on the device be performed, and
wherein the (l) setting sets the transmission order such that the priority for the transmission order for a second command generated based on a first command specifying that the firmware version of the device program be updated is higher than the priority for the transmission order for a second command generated based on a first command specifying that settings information on the device be performed.

4. The communication system according to claim 1, wherein the (d) generating generates a first command specifying that modification to settings information on the device be performed in response to one of the plurality of instruction information acquired in the (b) acquiring including settings modification information, the settings modification information being information indicating that the modification to the settings information on the device be performed,
wherein the modification to the settings information includes a first modification and a second modification, the first modification being modification to the settings information not requiring a restart of the device program, the second modification being modification to the settings information that requires the restart of the device program, and
wherein the (l) setting sets the transmission order such that the priority for the transmission order for a second command generated based on a first command specifying that the first modification be performed is higher than the priority for the transmission order for a second command generated based on a first command specifying that the second modification be performed.

5. The communication system according to claim 2, wherein the (l) setting sets a transmission order for the plurality of first commands, the plurality of first commands being transmitted to the mediation apparatus in the (e) transmitting in the set transmission order, the transmission order for the plurality of first commands being set by setting a priority for the transmission order for each of the plurality of first commands,
wherein the (e) transmitting comprises:
(e1) transmitting a first command of the plurality of first commands via the firewall; and (e2) transmitting another first command of the plurality of first commands via the firewall, the priority for the transmission order for the first command being higher than the priority of transmission order for the another first command, the (e1) transmitting being performed before the (e2) transmitting is performed, wherein the first controller is configured to further perform:

(m) receiving, via the firewall, a reception notification indicating that the first command transmitted in the (e1) transmitting has been received, the (e2) transmitting being performed after the (m) receiving is performed, wherein the plurality of second commands is generated in an order the same as the transmission order set for the plurality of first commands, and wherein the (j) transmitting, to the device via the local network, transmits the plurality of second commands each generated in the (i) generating in an order the same as the order in which the plurality of second commands is generated.

6. The communication system according to claim 2, wherein the (d) generating generates each of the plurality of first commands while including transmission order information therein, the transmission order information being information indicative of the transmission order set for the plurality of second commands to be generated based on the plurality of first commands, and wherein, in accordance with the transmission order information included in each of the plurality of first commands, the (j) transmitting transmits, to the device via the local network, the plurality of second commands generated based on the plurality of first commands.

7. The communication system according to claim 2, wherein the first controller is configured to generate a package data including, in a manner that indicates the transmission order set in the (l) setting, the plurality of first commands each generated in the (d) generating, wherein the (e) transmitting transmits the generated package data to the mediation apparatus via the firewall, and wherein the (j1) transmitting and the (j2) transmitting are performed in accordance with the transmission order indicated by the manner represented by the package data.

8. The communication system according to claim 1, wherein, in a case where a plurality of additional instruction information has been acquired in the (b) acquiring in a state where there is a plurality of first commands each of which transmission order has been set and has not yet been transmitted to the mediation apparatus, a plurality of additional first commands is generated in the (d) generating based on the received plurality of additional instruction information, and wherein the (l) setting sets the transmission order for all of the plurality of additional first commands and the plurality of first commands that has not yet been transmitted to the mediation apparatus in accordance with characteristics of the device instruction included in each of the plurality of additional first commands and the plurality of first commands.

9. The communication system according to claim 1, wherein, in a case where a plurality of additional first commands generated based on a plurality of additional instruction information has been received in the (f) receiving in a state where there is a plurality of second commands each of which transmission order has been set and has not yet been transmitted to the device, a plurality of additional second commands is generated in the (i) generating based on the received plurality of additional first commands, and wherein the (l) setting sets the transmission order for all of the plurality of additional second commands and the plurality of second commands that has not yet been transmitted to the device in accordance with characteristics of the device instruction included in each of the plurality of additional second commands and the plurality of second commands.

10. The communication system according to claim 1, wherein the first controller is configured to further perform:

(n) requesting, via the Internet, a management server to register the device ID correlated to the mediation apparatus ID in the correlation database; and (o) transmitting, to the management server via the Internet, a response indicative of the response received in the (f) receiving, and wherein the (b) acquiring is performed after the (n) requesting is performed, the (b) acquiring acquiring a plurality of third commands from the management server by receiving the plurality of third commands from the management server via the Internet, each of the plurality of third commands including the device ID and one of the plurality of instruction information.

11. A non-transitory computer-readable storage medium storing a set of first computer-readable instructions for an information processing apparatus and a set of second computer-readable instructions for a mediation apparatus, the information processing apparatus being connected to the Internet, the information processing apparatus comprising a first processor and a memory, the mediation apparatus being connected to a local network and comprising a second processor, the mediation apparatus and the information processing apparatus being capable of communicating with each other via a firewall, the mediation apparatus being capable of communicating with a device via the local network, the set of first computer-readable instructions, when executed by the first processor, causing the information processing apparatus to perform:

(a) storing a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device;

(b) acquiring a plurality of instruction information, each of the plurality of instruction information including a device instruction and a device information, the device instruction being instruction for the device, the device information being indicative of the device;

(c) identifying, for each of the plurality of instruction information, a device ID of the device and a mediation apparatus ID correlated to the identified device ID, the device ID being identified based on the device information, the mediation apparatus ID being identified using the correlation database;

(d) generating a first command, a plurality of first commands being generated based on the plurality of instruction information, each of the plurality of first commands including the device instruction included in the corresponding each of the plurality of instruction information and the device ID of the device identified for the corresponding each of the plurality of instruction information;

in response to a setup being performed by the mediation apparatus having the identified mediation apparatus ID, (e) transmitting, to the mediation apparatus having the identified mediation apparatus ID via the firewall, the plurality of first commands each generated in the (d) generating; and (f) receiving, via the firewall, a response to the plurality of first commands transmitted in the (e) transmitting;

the set of second computer-readable instructions, when executed by the second processor, causing the mediation apparatus to perform:

(g) starting the setup to allow information transmitted from the information processing apparatus to be received by the mediation apparatus via the firewall;

(h) receiving, via the firewall, the plurality of first commands transmitted in the (e) transmitting;

(i) generating a second command, a plurality of second commands being generated based on the plurality of first commands, each of the plurality of second commands including the device instruction included in the corresponding each of the plurality of first commands;

(j) transmitting, via the local network, the generated plurality of second commands to the device having the device ID included in the received the plurality of first commands; and (k) transmitting, via the firewall, the response to the received plurality of first commands to the information processing apparatus, wherein one of the set of first computer-readable instructions and the set of second computer-readable instructions, when executed by respective ones of the first processor and the second processor, causing the respective ones of the information processing apparatus and the mediation apparatus to further perform:

(l) setting a transmission order for the plurality of second commands generated in the (i) generating, the plurality of second commands being transmitted to the device in the (j) transmitting in the set transmission order, the transmission order being set by setting a priority for the transmission order for each of the plurality of second commands, wherein, in a case where the (l) setting is performed by the information processing apparatus, the information processing apparatus sets the transmission order based on characteristics of the device instruction included in the plurality of first commands corresponding to the plurality of second commands, wherein, in a case where the (l) setting is performed by the mediation apparatus, the mediation apparatus sets the transmission order based on characteristics of the device instruction included in the plurality of second commands, and wherein the (j) transmitting comprises:

(j1) transmitting a second command of the plurality of second commands via the local network; and (j2) transmitting another second command of the plurality of second commands via the local network, the priority for the transmission order for the second command being higher than the priority for the transmission order for the another second command, the (j1) transmitting being performed before the (j2) transmitting is performed.

12. A method for a communication system comprising an information processing apparatus, a mediation apparatus, and a device, the information processing apparatus comprising a first controller and a memory, the mediation apparatus comprising a second controller, the information processing apparatus and the mediation apparatus being capable of communicating with each other via a firewall, the mediation apparatus and the device being capable of communicating with each other via a local network, the method comprising:

(A) storing, using the first controller, a device ID and a mediation apparatus ID in a correlation database stored in the memory, the device ID being correlated to the mediation apparatus ID in the correlation database, the mediation apparatus ID being information used to identify the mediation apparatus, the device ID being information used to identify the device;

(B) acquiring, using the first controller, a plurality of instruction information, each of the plurality of instruction information including a device instruction and a device information, the device instruction being instruction for the device, the device information being indicative of the device;

(C) identifying, using the first controller, for each of the plurality of instruction information, a device ID of the device and a mediation apparatus ID correlated to the identified device ID, the device ID being identified based on the device information, the mediation apparatus ID being identified using the correlation database;

(D) generating, using the first controller, a first command, a plurality of first commands being generated based on the plurality of instruction information, each of the plurality of first commands including the device instruction included in the corresponding each of the plurality of instruction information and the device ID of the device identified for the corresponding each of the plurality of instruction information;

(E) starting, using the second controller, a setup to allow information transmitted from the first controller to be received by the second controller via the firewall;

in response to the (E) starting being performed using the second controller of the mediation apparatus having the identified mediation apparatus ID, (F) transmitting, to the mediation apparatus having the identified mediation apparatus ID via the firewall using the first controller, the plurality of first commands each generated in the (D) generating;

(G) receiving, via the firewall using the second controller, the plurality of first commands transmitted in the (F) transmitting;

(H) generating, using the second controller, a second command, a plurality of second commands being generated based on the plurality of first commands, each of the plurality of second commands including the device instruction included in the corresponding each of the plurality of first commands;

(I) transmitting, via the local network using the second controller, the generated plurality of second commands to the device having the device ID included in the received the plurality of first commands;

(J) transmitting, via the firewall using the second controller, a response to the received plurality of first commands to the information processing apparatus; and (K) receiving, via the firewall using the first controller, the response to the plurality of first commands transmitted in the (J) transmitting, wherein the method further comprises:
- (L) setting, using one of the first controller and the second controller, a transmission order for the plurality of second commands generated in the (H) generating, the plurality of second commands being transmitted to the device in the (I) transmitting in the set transmission order, the transmission order being set by setting a priority for the transmission order for each of the plurality of second commands, wherein, in a case where the (L) setting is performed using the first controller, the first controller sets the transmission order based on characteristics of the device instruction included in the plurality of first commands corresponding to the plurality of second commands, wherein, in a case where the (L) setting is performed using the second controller, the second controller sets the transmission order based on characteristics of the device instruction included in the plurality of second commands, and wherein the (I) transmitting comprises:
- (I1) transmitting a second command of the plurality of second commands via the local network; and
- (I2) transmitting another second command of the plurality of second commands via the local network, the priority for the transmission order for the second command being higher than the priority for the transmission order for the another second command, the (I1) transmitting being performed before the (I2) transmitting is performed.

* * * * *